United States Patent
Sikchi et al.

(10) Patent No.: US 7,721,190 B2
(45) Date of Patent: May 18, 2010

(54) METHODS AND SYSTEMS FOR SERVER SIDE FORM PROCESSING

(75) Inventors: Prakash Sikchi, Issaquah, WA (US); Ranjan Aggarwal, Redmond, WA (US); Brian G. O'Connor, Seattle, WA (US); David Airapetyan, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 994 days.

(21) Appl. No.: 10/990,152

(22) Filed: Nov. 16, 2004

(65) Prior Publication Data

US 2006/0106858 A1  May 18, 2006

(51) Int. Cl.
 *G06F 17/00* (2006.01)
(52) U.S. Cl. .................... 715/223; 715/224
(58) Field of Classification Search ......... 715/221–223, 715/234
 See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,926,476 A | 5/1990 | Covey | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,140,563 A | 8/1992 | Thinesen | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |
| 5,206,951 A | 4/1993 | Khoyi et al. | |
| 5,218,672 A | 6/1993 | Morgan et al. | |
| 5,220,649 A | 6/1993 | Forcier | |

(Continued)

FOREIGN PATENT DOCUMENTS

EP  0841615  11/1999

(Continued)

OTHER PUBLICATIONS

Hu et al., A Programmable Editor for Developing Structured Documents based on Bidirectional Transformations, ACM Aug. 2004, 178-189.*

(Continued)

*Primary Examiner*—Cong-Lac Huynh

(57) ABSTRACT

Various embodiments can efficiently utilize form server resources by, in at least some embodiments, acting only on one tree during the form editing process. Various embodiments can act on a form's data and not necessarily a representation of the form's view. The described embodiments can support various different presentation formats.

40 Claims, 6 Drawing Sheets

U.S. PATENT DOCUMENTS

| | | |
|---|---|---|
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,133 A | 9/1997 | Malamud et al. |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,621 A | 5/1999 | Bachman et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,731 A | 9/1999 | Glaser |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni |
| 5,991,731 A | 11/1999 | Colon et al. |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |

| Patent | Kind | Date | Inventors |
|---|---|---|---|
| 6,044,205 | A | 3/2000 | Reed et al. |
| 6,052,531 | A | 4/2000 | Waldin et al. |
| 6,052,710 | A | 4/2000 | Saliba et al. |
| 6,054,987 | A | 4/2000 | Richardson |
| 6,057,837 | A | 5/2000 | Hatakeda et al. |
| 6,058,413 | A | 5/2000 | Flores et al. |
| 6,065,043 | A | 5/2000 | Domenikos et al. |
| 6,069,626 | A | 5/2000 | Cline et al. |
| 6,070,184 | A | 5/2000 | Blount et al. |
| 6,072,870 | A | 6/2000 | Nguyen et al. |
| 6,078,326 | A | 6/2000 | Kilmer et al. |
| 6,078,327 | A | 6/2000 | Liman et al. |
| 6,078,924 | A | 6/2000 | Ainsbury et al. |
| 6,081,610 | A | 6/2000 | Dwork et al. |
| 6,084,585 | A | 7/2000 | Kraft et al. |
| 6,088,679 | A | 7/2000 | Barkley |
| 6,088,708 | A | 7/2000 | Burch et al. |
| 6,091,417 | A | 7/2000 | Lefkowitz |
| 6,094,657 | A | 7/2000 | Hailpern et al. |
| 6,096,096 | A | 8/2000 | Murphy et al. |
| 6,097,382 | A | 8/2000 | Rosen et al. |
| 6,098,081 | A | 8/2000 | Heidorn et al. |
| 6,105,012 | A | 8/2000 | Chang et al. |
| 6,108,637 | A | 8/2000 | Blumenau |
| 6,108,783 | A | 8/2000 | Krawczyk et al. |
| 6,115,646 | A | 9/2000 | Fiszman et al. |
| 6,121,965 | A | 9/2000 | Kenney et al. |
| 6,122,647 | A | 9/2000 | Horowitz |
| 6,144,969 | A | 11/2000 | Inokuchi et al. |
| 6,151,624 | A | 11/2000 | Teare et al. |
| 6,154,128 | A | 11/2000 | Wookey et al. |
| 6,163,772 | A | 12/2000 | Kramer et al. |
| 6,167,521 | A | 12/2000 | Smith et al. |
| 6,167,523 | A | 12/2000 | Strong |
| 6,182,094 | B1 | 1/2001 | Humpleman et al. |
| 6,182,095 | B1 | 1/2001 | Leymaster et al. |
| 6,188,401 | B1 | 2/2001 | Peyer |
| 6,191,797 | B1 | 2/2001 | Politis |
| 6,192,367 | B1 | 2/2001 | Hawley et al. |
| 6,195,661 | B1 | 2/2001 | Filepp et al. |
| 6,199,204 | B1 | 3/2001 | Donohue |
| 6,209,128 | B1 | 3/2001 | Gerard et al. |
| 6,216,152 | B1 | 4/2001 | Wong et al. |
| 6,219,423 | B1 | 4/2001 | Davis |
| 6,219,698 | B1 | 4/2001 | Iannucci et al. |
| 6,225,996 | B1 | 5/2001 | Gibb et al. |
| 6,235,027 | B1 | 5/2001 | Herzon |
| 6,243,088 | B1 | 6/2001 | McCormack et al. |
| 6,253,366 | B1 | 6/2001 | Mutschler, III |
| 6,253,374 | B1 | 6/2001 | Dresevic et al. |
| 6,263,313 | B1 | 7/2001 | Milsted et al. |
| 6,266,810 | B1 | 7/2001 | Tanaka et al. |
| 6,268,852 | B1 | 7/2001 | Lindhorst et al. |
| 6,272,506 | B1 | 8/2001 | Bell |
| 6,275,227 | B1 | 8/2001 | DeStefano |
| 6,275,599 | B1 | 8/2001 | Adler et al. |
| 6,279,042 | B1 | 8/2001 | Ouchi |
| 6,281,896 | B1 | 8/2001 | Alimpich et al. |
| 6,282,709 | B1 | 8/2001 | Reha et al. |
| 6,282,711 | B1 | 8/2001 | Halpern et al. |
| 6,286,033 | B1 | 9/2001 | Kishinsky et al. |
| 6,292,897 | B1 | 9/2001 | Gennaro et al. |
| 6,292,941 | B1 | 9/2001 | Jollands |
| 6,297,819 | B1 | 10/2001 | Furst |
| 6,300,948 | B1 | 10/2001 | Geller et al. |
| 6,307,955 | B1 | 10/2001 | Zank et al. |
| 6,308,179 | B1 | 10/2001 | Petersen et al. |
| 6,308,273 | B1 | 10/2001 | Goertzel et al. |
| 6,311,221 | B1 | 10/2001 | Raz et al. |
| 6,311,271 | B1 | 10/2001 | Gennaro et al. |
| 6,314,415 | B1 | 11/2001 | Mukherjee |
| 6,321,259 | B1 | 11/2001 | Ouellette et al. |
| 6,321,334 | B1 | 11/2001 | Jerger et al. |
| 6,327,628 | B1 | 12/2001 | Anuff et al. |
| 6,331,864 | B1 | 12/2001 | Coco et al. |
| 6,336,214 | B1 | 1/2002 | Sundaresan |
| 6,342,907 | B1 | 1/2002 | Petty et al. |
| 6,343,149 | B1 | 1/2002 | Motoiwa |
| 6,343,302 | B1 | 1/2002 | Graham |
| 6,343,377 | B1 | 1/2002 | Gessner et al. |
| 6,344,862 | B1 | 2/2002 | Williams et al. |
| 6,345,256 | B1 | 2/2002 | Milsted et al. |
| 6,345,278 | B1 | 2/2002 | Hitchcock et al. |
| 6,345,361 | B1 | 2/2002 | Jerger et al. |
| 6,347,323 | B1 | 2/2002 | Garber et al. |
| 6,349,408 | B1 | 2/2002 | Smith |
| 6,351,574 | B1 | 2/2002 | Yair et al. |
| 6,353,851 | B1 | 3/2002 | Anupam et al. |
| 6,353,926 | B1 | 3/2002 | Parthesarathy |
| 6,356,906 | B1 | 3/2002 | Lippert et al. |
| 6,357,038 | B1 | 3/2002 | Scouten |
| 6,366,907 | B1 | 4/2002 | Fanning et al. |
| 6,366,912 | B1 | 4/2002 | Wallent et al. |
| 6,367,013 | B1 | 4/2002 | Bisbee et al. |
| 6,369,840 | B1 | 4/2002 | Barnett et al. |
| 6,369,841 | B1 | 4/2002 | Salomon et al. |
| 6,374,402 | B1 | 4/2002 | Schmeidler et al. |
| 6,381,742 | B2 | 4/2002 | Forbes et al. |
| 6,381,743 | B1 | 4/2002 | Mutschler, III |
| 6,389,434 | B1 | 5/2002 | Rivette |
| 6,393,456 | B1 | 5/2002 | Ambler et al. |
| 6,393,469 | B1 | 5/2002 | Dozier et al. |
| 6,396,488 | B1 | 5/2002 | Simmons et al. |
| 6,397,264 | B1 | 5/2002 | Stasnick et al. |
| 6,405,221 | B1 | 6/2002 | Levine et al. |
| 6,405,238 | B1 | 6/2002 | Votipka |
| 6,408,311 | B1 | 6/2002 | Baisley et al. |
| 6,414,700 | B1 | 7/2002 | Kurtenbach et al. |
| 6,421,070 | B1 | 7/2002 | Ramos et al. |
| 6,421,656 | B1 | 7/2002 | Cheng et al. |
| 6,421,777 | B1 | 7/2002 | Pierre-Louis |
| 6,425,125 | B1 | 7/2002 | Fries et al. |
| 6,429,885 | B1 | 8/2002 | Saib et al. |
| 6,434,563 | B1 | 8/2002 | Pasquali et al. |
| 6,434,564 | B2 | 8/2002 | Ebert |
| 6,442,563 | B1 | 8/2002 | Bacon et al. |
| 6,442,755 | B1 | 8/2002 | Lemmons et al. |
| 6,446,110 | B1 | 9/2002 | Lection et al. |
| 6,449,617 | B1 | 9/2002 | Quinn et al. |
| 6,457,009 | B1 | 9/2002 | Bollay |
| 6,460,058 | B2 | 10/2002 | Koppolu |
| 6,463,419 | B1 | 10/2002 | Kluss |
| 6,470,349 | B1 | 10/2002 | Heninger |
| 6,473,800 | B1 | 10/2002 | Jerger et al. |
| 6,476,828 | B1 | 11/2002 | Burkett et al. |
| 6,476,833 | B1 | 11/2002 | Moshfeghi |
| 6,477,544 | B1 | 11/2002 | Bolosky |
| 6,480,860 | B1 | 11/2002 | Monday |
| 6,487,566 | B1 | 11/2002 | Sundaresan |
| 6,490,601 | B1 | 12/2002 | Markus et al. |
| 6,493,007 | B1 | 12/2002 | Pang |
| 6,493,702 | B1 | 12/2002 | Adar et al. |
| 6,501,864 | B1 | 12/2002 | Eguchi et al. |
| 6,502,101 | B1 | 12/2002 | Verprauskus et al. |
| 6,502,103 | B1 | 12/2002 | Frey et al. |
| 6,505,200 | B1 | 1/2003 | Ims et al. |
| 6,505,230 | B1 | 1/2003 | Mohan et al. |
| 6,505,300 | B2 | 1/2003 | Chan et al. |
| 6,507,856 | B1 | 1/2003 | Chen et al. |
| 6,516,322 | B1 | 2/2003 | Meredith |
| 6,519,617 | B1 | 2/2003 | Wanderski et al. |
| 6,535,229 | B1 | 3/2003 | Kraft |
| 6,535,883 | B1 | 3/2003 | Lee et al. |
| RE38,070 | E | 4/2003 | Spies et al. |
| 6,546,546 | B1 | 4/2003 | Van Doorn |
| 6,546,554 | B1 | 4/2003 | Schmidt et al. |

| Patent | Kind | Date | Inventors | Patent | Kind | Date | Inventors |
|---|---|---|---|---|---|---|---|
| 6,549,221 | B1 | 4/2003 | Brown et al. | 6,781,609 | B1 | 8/2004 | Barker et al. |
| 6,549,878 | B1 | 4/2003 | Lowry et al. | 6,782,144 | B2 | 8/2004 | Bellavita et al. |
| 6,549,922 | B1 | 4/2003 | Srivastava et al. | 6,799,299 | B1 | 9/2004 | Li et al. |
| 6,553,402 | B1 | 4/2003 | Makarios et al. | 6,801,929 | B1 | 10/2004 | Donoho et al. |
| 6,560,616 | B1 | 5/2003 | Garber | 6,816,849 | B1 | 11/2004 | Halt, Jr. |
| 6,560,620 | B1 | 5/2003 | Ching | 6,828,992 | B1 | 12/2004 | Freeman et al. |
| 6,560,640 | B2 | 5/2003 | Smethers | 6,845,380 | B2 | 1/2005 | Su et al. |
| 6,563,514 | B1 | 5/2003 | Samar | 6,845,499 | B2 | 1/2005 | Srivastava et al. |
| 6,571,253 | B1 | 5/2003 | Thompson et al. | 6,847,387 | B2 | 1/2005 | Roth |
| 6,578,144 | B1 | 6/2003 | Gennaro et al. | 6,848,078 | B1 | 1/2005 | Birsan et al. |
| 6,581,061 | B2 | 6/2003 | Graham | 6,850,895 | B2 | 2/2005 | Brodersen et al. |
| 6,584,469 | B1 | 6/2003 | Chiang et al. | 6,862,689 | B2 | 3/2005 | Bergsten et al. |
| 6,584,548 | B1 | 6/2003 | Bourne et al. | 6,871,220 | B1 | 3/2005 | Rajan et al. |
| 6,585,778 | B1 | 7/2003 | Hind et al. | 6,871,345 | B1 | 3/2005 | Crow et al. |
| 6,589,290 | B1 | 7/2003 | Maxwell et al. | 6,874,130 | B1 | 3/2005 | Baweja et al. |
| 6,594,686 | B1 | 7/2003 | Edwards et al. | 6,876,996 | B2 | 4/2005 | Czajkowski et al. |
| 6,598,219 | B1 | 7/2003 | Lau | 6,883,168 | B1 | 4/2005 | James et al. |
| 6,603,489 | B1 | 8/2003 | Edlund et al. | 6,889,359 | B1 | 5/2005 | Conner et al. |
| 6,604,099 | B1 | 8/2003 | Chung et al. | 6,901,403 | B1 | 5/2005 | Bata et al. |
| 6,606,606 | B2 | 8/2003 | Starr | 6,915,454 | B1 | 7/2005 | Moore et al. |
| 6,609,200 | B2 | 8/2003 | Anderson et al. | 6,925,609 | B1 | 8/2005 | Lucke |
| 6,611,822 | B1 | 8/2003 | Beams et al. | 6,931,532 | B1 | 8/2005 | Davis et al. |
| 6,611,840 | B1 | 8/2003 | Baer et al. | 6,941,510 | B1 | 9/2005 | Ozzie et al. |
| 6,611,843 | B1 | 8/2003 | Jacobs | 6,941,511 | B1 | 9/2005 | Hind et al. |
| 6,613,098 | B1 | 9/2003 | Sorge et al. | 6,941,521 | B2 | 9/2005 | Lin et al. |
| 6,615,276 | B1 | 9/2003 | Mastrianni et al. | 6,948,129 | B1 | 9/2005 | Loghmani |
| 6,629,109 | B1 | 9/2003 | Koshisaka | 6,948,133 | B2 | 9/2005 | Haley |
| 6,631,357 | B1 | 10/2003 | Perkowski | 6,948,135 | B1 | 9/2005 | Ruthfield et al. |
| 6,631,379 | B2 | 10/2003 | Cox | 6,950,980 | B1 | 9/2005 | Malcolm |
| 6,631,497 | B1 | 10/2003 | Jamshidi et al. | 6,950,987 | B1 | 9/2005 | Hargraves et al. |
| 6,631,519 | B1 | 10/2003 | Nicholson et al. | 6,957,395 | B1 | 10/2005 | Jobs et al. |
| 6,632,251 | B1 | 10/2003 | Rutten et al. | 6,961,897 | B1 | 11/2005 | Peel, Jr. et al. |
| 6,633,315 | B1 | 10/2003 | Sobeski et al. | 6,963,875 | B2 | 11/2005 | Moore et al. |
| 6,635,089 | B1 | 10/2003 | Burkett et al. | 6,968,503 | B1 | 11/2005 | Chang et al. |
| 6,636,845 | B2 | 10/2003 | Chau et al. | 6,968,505 | B2 | 11/2005 | Stoll et al. |
| 6,643,633 | B2 | 11/2003 | Chau et al. | 6,993,714 | B2 | 1/2006 | Kaler et al. |
| 6,643,652 | B2 | 11/2003 | Helgeson et al. | 6,993,722 | B1 | 1/2006 | Greer et al. |
| 6,643,684 | B1 | 11/2003 | Malkin et al. | 6,996,776 | B1 | 2/2006 | Makely et al. |
| 6,651,217 | B1 | 11/2003 | Kennedy et al. | 6,996,781 | B1 | 2/2006 | Myers et al. |
| 6,654,737 | B1 | 11/2003 | Nunez | 7,000,179 | B2 | 2/2006 | Yankovich et al. |
| 6,654,932 | B1 | 11/2003 | Bahrs et al. | 7,002,560 | B2 | 2/2006 | Graham |
| 6,658,417 | B1 | 12/2003 | Stakutis et al. | 7,003,548 | B1 | 2/2006 | Barck et al. |
| 6,658,622 | B1 | 12/2003 | Aiken et al. | 7,003,722 | B2 | 2/2006 | Rothchiller et al. |
| 6,661,920 | B1 | 12/2003 | Skinner | 7,010,580 | B1 | 3/2006 | Fu et al. |
| 6,668,369 | B1 | 12/2003 | Krebs et al. | 7,020,869 | B2 | 3/2006 | Abriari et al. |
| 6,671,805 | B1 | 12/2003 | Brown et al. | 7,024,417 | B1 | 4/2006 | Russakovsky et al. |
| 6,675,202 | B1 | 1/2004 | Perttunen | 7,032,170 | B2 | 4/2006 | Poulose |
| 6,678,717 | B1 | 1/2004 | Schneider | 7,036,072 | B1 | 4/2006 | Sulistio et al. |
| 6,681,370 | B2 * | 1/2004 | Gounares et al. ............ 715/238 | 7,039,875 | B2 | 5/2006 | Khalfay et al. |
| 6,691,230 | B1 | 2/2004 | Bardon | 7,043,687 | B2 | 5/2006 | Knauss et al. |
| 6,691,281 | B1 | 2/2004 | Sorge et al. | 7,051,273 | B1 | 5/2006 | Holt et al. |
| 6,697,944 | B1 | 2/2004 | Jones et al. | 7,058,663 | B2 | 6/2006 | Johnston et al. |
| 6,701,434 | B1 | 3/2004 | Rohatgi | 7,062,764 | B2 | 6/2006 | Cohen et al. |
| 6,701,486 | B1 | 3/2004 | Weber et al. | 7,065,493 | B1 | 6/2006 | Homsi |
| 6,704,906 | B1 | 3/2004 | Yankovich et al. | 7,076,728 | B2 | 7/2006 | Davis et al. |
| 6,711,679 | B1 | 3/2004 | Guski et al. | 7,080,083 | B2 | 7/2006 | Kim et al. |
| 6,720,985 | B1 | 4/2004 | Silverbrook et al. | 7,080,325 | B2 | 7/2006 | Treibach-Heck et al. |
| 6,725,426 | B1 | 4/2004 | Pavlov | 7,081,882 | B2 | 7/2006 | Sowden et al. |
| 6,728,755 | B1 | 4/2004 | de Ment | 7,086,009 | B2 | 8/2006 | Resnick et al. |
| 6,735,721 | B1 | 5/2004 | Morrow et al. | 7,086,042 | B2 | 8/2006 | Abe et al. |
| 6,745,367 | B1 | 6/2004 | Bates et al. | 7,088,374 | B2 | 8/2006 | David et al. |
| 6,748,385 | B1 | 6/2004 | Rodkin | 7,100,147 | B2 | 8/2006 | Miller et al. |
| 6,748,569 | B1 | 6/2004 | Brooke et al. | 7,103,611 | B2 | 9/2006 | Murthy et al. |
| 6,751,777 | B2 | 6/2004 | Bates | 7,106,888 | B1 | 9/2006 | Silverbrook et al. |
| 6,754,874 | B1 | 6/2004 | Richman | 7,107,282 | B1 | 9/2006 | Yalamanchi |
| 6,757,826 | B1 | 6/2004 | Paltenghe | 7,107,521 | B2 | 9/2006 | Santos |
| 6,757,868 | B1 | 6/2004 | Glaser et al. | 7,107,539 | B2 | 9/2006 | Abbott et al. |
| 6,760,723 | B2 | 7/2004 | Oshinsky et al. | 7,120,863 | B1 | 10/2006 | Wang |
| 6,763,343 | B1 | 7/2004 | Brooke et al. | 7,124,167 | B1 | 10/2006 | Bellotti et al. |
| 6,772,139 | B1 | 8/2004 | Smith, III | 7,130,885 | B2 | 10/2006 | Chandra et al. |
| 6,772,165 | B2 | 8/2004 | O'Carroll | 7,143,341 | B1 | 11/2006 | Kohli |
| 6,774,926 | B1 | 8/2004 | Ellis et al. | 7,146,564 | B2 | 12/2006 | Kim et al. |
| 6,779,154 | B1 | 8/2004 | Nussbaum et al. | 7,152,205 | B2 | 12/2006 | Day et al. |

| | | | | | | |
|---|---|---|---|---|---|---|
| 7,168,035 | B1 | 1/2007 | Bell et al. | 2002/0070973 A1 | 6/2002 | Croley |
| 7,178,166 | B1 | 2/2007 | Taylor et al. | 2002/0078074 A1 | 6/2002 | Cho et al. |
| 7,190,376 | B1 | 3/2007 | Tonisson | 2002/0078103 A1 | 6/2002 | Gorman et al. |
| 7,191,394 | B1 | 3/2007 | Ardeleanu et al. | 2002/0083145 A1 | 6/2002 | Perinpanathan |
| 7,200,665 | B2 | 4/2007 | Eshghi et al. | 2002/0083148 A1 | 6/2002 | Shaw et al. |
| 7,200,816 | B2 | 4/2007 | Falk et al. | 2002/0083318 A1 | 6/2002 | Larose |
| 7,213,200 | B2 | 5/2007 | Abe et al. | 2002/0091738 A1 | 7/2002 | Rohrabaugh et al. |
| 7,236,982 | B2 | 6/2007 | Zlatanov et al. | 2002/0099952 A1 | 7/2002 | Lambert et al. |
| 7,237,114 | B1 | 6/2007 | Rosenberg | 2002/0100027 A1 | 7/2002 | Binding et al. |
| 7,249,328 | B1 | 7/2007 | Davis | 2002/0107885 A1 | 8/2002 | Brooks et al. |
| 7,281,018 | B1 * | 10/2007 | Begun et al. ............... 707/102 | 2002/0111699 A1 | 8/2002 | Melli et al. |
| 7,281,206 | B2 | 10/2007 | Schnelle et al. | 2002/0111932 A1 | 8/2002 | Roberge et al. |
| 7,281,245 | B2 | 10/2007 | Reynar et al. | 2002/0112224 A1 | 8/2002 | Cox |
| 7,284,208 | B2 | 10/2007 | Matthews | 2002/0129056 A1 | 9/2002 | Conant |
| 7,287,218 | B1 | 10/2007 | Knotz et al. | 2002/0133484 A1 | 9/2002 | Chau et al. |
| 7,296,017 | B2 | 11/2007 | Larcheveque et al. | 2002/0152222 A1 | 10/2002 | Holbrook |
| 7,313,758 | B2 | 12/2007 | Kozlov | 2002/0152244 A1 | 10/2002 | Dean et al. |
| 7,316,003 | B1 | 1/2008 | Dulepet et al. | 2002/0156772 A1 | 10/2002 | Chau et al. |
| 7,318,237 | B2 | 1/2008 | Moriconi et al. | 2002/0156846 A1 | 10/2002 | Rawat et al. |
| 7,337,391 | B2 | 2/2008 | Clarke et al. | 2002/0156929 A1 | 10/2002 | Hekmatpour |
| 7,337,392 | B2 * | 2/2008 | Lue ............................ 715/234 | 2002/0169752 A1 | 11/2002 | Kusama et al. |
| 7,346,610 | B2 | 3/2008 | Ruthfield et al. | 2002/0169789 A1 | 11/2002 | Kutay et al. |
| 7,346,840 | B1 | 3/2008 | Ravishankar et al. | 2002/0174147 A1 | 11/2002 | Wang et al. |
| 7,346,848 | B1 | 3/2008 | Ruthfield et al. | 2002/0174417 A1 | 11/2002 | Sijacic et al. |
| 7,350,141 | B2 | 3/2008 | Kotler et al. | 2002/0178187 A1 | 11/2002 | Rasmussen et al. |
| 7,373,595 | B2 * | 5/2008 | Jones et al. ................ 715/234 | 2002/0178380 A1 | 11/2002 | Wolf et al. |
| 7,376,673 | B1 | 5/2008 | Chalecki et al. | 2002/0184188 A1 | 12/2002 | Mandyam et al. |
| 7,412,649 | B2 | 8/2008 | Emek et al. | 2002/0184219 A1 | 12/2002 | Preisig et al. |
| 7,424,671 | B2 | 9/2008 | Elza et al. | 2002/0184485 A1 | 12/2002 | Dray et al. |
| 7,428,699 | B1 | 9/2008 | Kane et al. | 2002/0188597 A1 | 12/2002 | Kern et al. |
| 7,441,200 | B2 | 10/2008 | Savage | 2002/0188613 A1 | 12/2002 | Chakraborty et al. |
| 7,490,109 | B1 | 2/2009 | Sikchi et al. | 2002/0194219 A1 | 12/2002 | Bradley et al. |
| 7,496,632 | B2 | 2/2009 | Chapman et al. | 2002/0196281 A1 | 12/2002 | Audleman et al. |
| 7,496,837 | B1 * | 2/2009 | Larcheveque et al. ....... 715/237 | 2002/0196288 A1 | 12/2002 | Emrani |
| 7,543,228 | B2 | 6/2009 | Kelkar | 2002/0198891 A1 | 12/2002 | Li et al. |
| 7,549,115 | B2 | 6/2009 | Kotler | 2002/0198935 A1 | 12/2002 | Crandall, Sr. et al. |
| 7,584,417 | B2 | 9/2009 | Friend | 2003/0004951 A1 | 1/2003 | Chokshi |
| 7,613,996 | B2 | 11/2009 | Dallett et al. | 2003/0007000 A1 | 1/2003 | Carlson et al. |
| 7,673,227 | B2 | 3/2010 | Kotler et al. | 2003/0014397 A1 | 1/2003 | Chau et al. |
| 7,673,228 | B2 | 3/2010 | Kelkar et al. | 2003/0018668 A1 | 1/2003 | Britton et al. |
| 7,676,843 | B1 | 3/2010 | Stott et al. | 2003/0020746 A1 | 1/2003 | Chen et al. |
| 2001/0007109 | A1 | 7/2001 | Lange | 2003/0023641 A1 | 1/2003 | Gorman et al. |
| 2001/0016880 | A1 | 8/2001 | Cai et al. | 2003/0025732 A1 | 2/2003 | Prichard |
| 2001/0022592 | A1 | 9/2001 | Alimpich et al. | 2003/0026507 A1 | 2/2003 | Zlotnick |
| 2001/0024195 | A1 | 9/2001 | Hayakawa | 2003/0028550 A1 * | 2/2003 | Lee et al. .................... 707/200 |
| 2001/0037345 | A1 | 11/2001 | Kiernan et al. | 2003/0037303 A1 | 2/2003 | Bodlaender |
| 2001/0044850 | A1 | 11/2001 | Raz et al. | 2003/0038788 A1 | 2/2003 | Demartines et al. |
| 2001/0051928 | A1 | 12/2001 | Brody | 2003/0038846 A1 | 2/2003 | Hori et al. |
| 2001/0054004 | A1 | 12/2001 | Powers | 2003/0043986 A1 | 3/2003 | Creamer |
| 2001/0056411 | A1 | 12/2001 | Lindskog et al. | 2003/0046665 A1 | 3/2003 | Ilin |
| 2001/0056429 | A1 | 12/2001 | Moore et al. | 2003/0048301 A1 | 3/2003 | Menninger |
| 2001/0056460 | A1 | 12/2001 | Sahota et al. | 2003/0051243 A1 | 3/2003 | Lemmons et al. |
| 2002/0010700 | A1 | 1/2002 | Wotring | 2003/0055811 A1 | 3/2003 | Stork et al. |
| 2002/0010743 | A1 | 1/2002 | Ryan et al. | 2003/0055828 A1 | 3/2003 | Koch et al. |
| 2002/0010746 | A1 | 1/2002 | Jilk, Jr. et al. | 2003/0056198 A1 | 3/2003 | Al-Azzawe |
| 2002/0013788 | A1 | 1/2002 | Pennell et al. | 2003/0061386 A1 | 3/2003 | Brown |
| 2002/0019941 | A1 | 2/2002 | Chan et al. | 2003/0061567 A1 | 3/2003 | Brown et al. |
| 2002/0023113 | A1 | 2/2002 | Hsing et al. | 2003/0084424 A1 | 5/2003 | Reddy et al. |
| 2002/0026441 | A1 | 2/2002 | Kutay et al. | 2003/0093755 A1 | 5/2003 | O'Carroll |
| 2002/0026461 | A1 | 2/2002 | Kutay et al. | 2003/0110443 A1 | 6/2003 | Yankovich et al. |
| 2002/0032590 | A1 | 3/2002 | Anand et al. | 2003/0120578 A1 | 6/2003 | Newman |
| 2002/0032692 | A1 | 3/2002 | Suzuki et al. | 2003/0120651 A1 | 6/2003 | Bernstein et al. |
| 2002/0032706 | A1 | 3/2002 | Perla et al. | 2003/0120659 A1 | 6/2003 | Sridhar |
| 2002/0032768 | A1 | 3/2002 | Voskuil | 2003/0120671 A1 | 6/2003 | Kim et al. |
| 2002/0035579 | A1 | 3/2002 | Wang et al. | 2003/0120686 A1 | 6/2003 | Kim et al. |
| 2002/0035581 | A1 | 3/2002 | Reynar et al. | 2003/0126555 A1 | 7/2003 | Aggarwal et al. |
| 2002/0040469 | A1 | 4/2002 | Pramberger | 2003/0128196 A1 | 7/2003 | Lapstun et al. |
| 2002/0052769 | A1 | 5/2002 | Navani et al. | 2003/0135825 A1 | 7/2003 | Gertner et al. |
| 2002/0053021 | A1 | 5/2002 | Rice et al. | 2003/0140132 A1 | 7/2003 | Champagne |
| 2002/0054126 | A1 | 5/2002 | Gamon | 2003/0140160 A1 | 7/2003 | Raz et al. |
| 2002/0054297 | A1 | 5/2002 | Grimes et al. | 2003/0142072 A1 | 7/2003 | Lapstun et al. |
| 2002/0065798 | A1 | 5/2002 | Bostleman et al. | 2003/0149934 A1 | 8/2003 | Worden |
| 2002/0065847 | A1 * | 5/2002 | Furukawa et al. .......... 707/505 | 2003/0158897 A1 | 8/2003 | Ben-Natan et al. |

| | | | | | |
|---|---|---|---|---|---|
| 2003/0163285 A1 | 8/2003 | Nakamura et al. | 2004/0194035 A1 | 9/2004 | Chakraborty |
| 2003/0167277 A1 | 9/2003 | Hejlsberg et al. | 2004/0199572 A1 | 10/2004 | Hunt et al. |
| 2003/0172113 A1 | 9/2003 | Cameron et al. | 2004/0205473 A1 | 10/2004 | Fisher et al. |
| 2003/0182268 A1 | 9/2003 | Lal | 2004/0205525 A1 | 10/2004 | Murren et al. |
| 2003/0182327 A1 | 9/2003 | Ramanujam et al. | 2004/0205534 A1 | 10/2004 | Koelle |
| 2003/0187756 A1 | 10/2003 | Klivington et al. | 2004/0205571 A1 | 10/2004 | Adler |
| 2003/0187930 A1 | 10/2003 | Ghaffar et al. | 2004/0205592 A1 | 10/2004 | Huang |
| 2003/0188260 A1 | 10/2003 | Jensen et al. | 2004/0205605 A1 | 10/2004 | Adler et al. |
| 2003/0189593 A1 | 10/2003 | Yarvin | 2004/0205653 A1 | 10/2004 | Hadfield et al. |
| 2003/0192008 A1 | 10/2003 | Lee | 2004/0205671 A1 | 10/2004 | Sukehiro et al. |
| 2003/0200506 A1 | 10/2003 | Abe et al. | 2004/0210599 A1 | 10/2004 | Friedman et al. |
| 2003/0204481 A1 | 10/2003 | Lau | 2004/0216084 A1 | 10/2004 | Brown et al. |
| 2003/0204511 A1 | 10/2003 | Brundage | 2004/0221238 A1 | 11/2004 | Cifra et al. |
| 2003/0204814 A1 | 10/2003 | Elo et al. | 2004/0221245 A1 | 11/2004 | Chickles et al. |
| 2003/0205615 A1 | 11/2003 | Marappan | 2004/0237030 A1 | 11/2004 | Malkin |
| 2003/0210428 A1* | 11/2003 | Bevlin et al. ............... 358/1.18 | 2004/0260593 A1 | 12/2004 | Abraham-Fuchs et al. |
| 2003/0212664 A1 | 11/2003 | Breining et al. | 2004/0261019 A1 | 12/2004 | Imamura et al. |
| 2003/0212902 A1 | 11/2003 | van der Made | 2004/0268229 A1 | 12/2004 | Paoli et al. |
| 2003/0217053 A1 | 11/2003 | Bachman et al. | 2005/0004893 A1 | 1/2005 | Sangroniz |
| 2003/0218620 A1 | 11/2003 | Lai et al. | 2005/0005248 A1 | 1/2005 | Rockey et al. |
| 2003/0220930 A1 | 11/2003 | Milleker et al. | 2005/0015279 A1 | 1/2005 | Rucker |
| 2003/0225469 A1 | 12/2003 | DeRemer et al. | 2005/0015732 A1 | 1/2005 | Vedula et al. |
| 2003/0225768 A1 | 12/2003 | Chaudhuri | 2005/0022115 A1 | 1/2005 | Baumgartner et al. |
| 2003/0225829 A1 | 12/2003 | Pena et al. | 2005/0027757 A1 | 2/2005 | Kiessig et al. |
| 2003/0226132 A1 | 12/2003 | Tondreau et al. | 2005/0028073 A1 | 2/2005 | Henry et al. |
| 2003/0233374 A1 | 12/2003 | Spinola et al. | 2005/0033626 A1 | 2/2005 | Kruse et al. |
| 2003/0233644 A1 | 12/2003 | Cohen et al. | 2005/0033728 A1 | 2/2005 | James et al. |
| 2003/0236859 A1 | 12/2003 | Vaschillo et al. | 2005/0038711 A1 | 2/2005 | Marlelo |
| 2003/0236903 A1 | 12/2003 | Piotrowski | 2005/0050066 A1 | 3/2005 | Hughes |
| 2003/0237046 A1* | 12/2003 | Parker et al. ............... 715/513 | 2005/0055627 A1 | 3/2005 | Lloyd et al. |
| 2003/0237047 A1* | 12/2003 | Borson ...................... 715/513 | 2005/0060324 A1 | 3/2005 | Johnson et al. |
| 2004/0002939 A1 | 1/2004 | Arora | 2005/0060647 A1 | 3/2005 | Doan et al. |
| 2004/0002950 A1 | 1/2004 | Brennan et al. | 2005/0060721 A1 | 3/2005 | Choudhary et al. |
| 2004/0003031 A1 | 1/2004 | Brown et al. | 2005/0065933 A1 | 3/2005 | Goering |
| 2004/0003353 A1 | 1/2004 | Rivera et al. | 2005/0065936 A1* | 3/2005 | Goering ...................... 707/100 |
| 2004/0003389 A1 | 1/2004 | Reynar et al. | 2005/0066287 A1 | 3/2005 | Tattrie et al. |
| 2004/0006744 A1 | 1/2004 | Jones et al. | 2005/0071752 A1 | 3/2005 | Marlatt |
| 2004/0010752 A1 | 1/2004 | Chan et al. | 2005/0076049 A1 | 4/2005 | Qubti et al. |
| 2004/0015783 A1 | 1/2004 | Lennon et al. | 2005/0080801 A1 | 4/2005 | Kothandaraman et al. |
| 2004/0024842 A1 | 2/2004 | Witt | 2005/0091285 A1 | 4/2005 | Krishnan et al. |
| 2004/0030991 A1 | 2/2004 | Hepworth et al. | 2005/0091305 A1 | 4/2005 | Lange et al. |
| 2004/0039881 A1 | 2/2004 | Shoebridge et al. | 2005/0097536 A1 | 5/2005 | Bernstein et al. |
| 2004/0039990 A1 | 2/2004 | Bakar et al. | 2005/0102370 A1 | 5/2005 | Lin et al. |
| 2004/0039993 A1 | 2/2004 | Kougiouris et al. | 2005/0102612 A1 | 5/2005 | Allan et al. |
| 2004/0044961 A1 | 3/2004 | Pesenson | 2005/0108104 A1 | 5/2005 | Woo |
| 2004/0044965 A1 | 3/2004 | Toyama et al. | 2005/0108624 A1 | 5/2005 | Carrier |
| 2004/0046789 A1 | 3/2004 | Inanoria | 2005/0114757 A1 | 5/2005 | Sahota et al. |
| 2004/0054966 A1 | 3/2004 | Busch et al. | 2005/0114764 A1* | 5/2005 | Gudenkauf et al. ......... 715/517 |
| 2004/0059754 A1 | 3/2004 | Barghout et al. | 2005/0132043 A1 | 6/2005 | Wang et al. |
| 2004/0073565 A1 | 4/2004 | Kaufman et al. | 2005/0132196 A1 | 6/2005 | Dietl |
| 2004/0073868 A1 | 4/2004 | Easter et al. | 2005/0138031 A1 | 6/2005 | Wefers |
| 2004/0078756 A1 | 4/2004 | Napper et al. | 2005/0138086 A1 | 6/2005 | Pecht-Seibert |
| 2004/0083426 A1 | 4/2004 | Sahu | 2005/0138539 A1 | 6/2005 | Bravery et al. |
| 2004/0088647 A1 | 5/2004 | Miller et al. | 2005/0149375 A1 | 7/2005 | Wefers |
| 2004/0088652 A1 | 5/2004 | Abe et al. | 2005/0149726 A1 | 7/2005 | Joshi et al. |
| 2004/0093596 A1 | 5/2004 | Koyano | 2005/0160398 A1 | 7/2005 | Bjornson et al. |
| 2004/0107367 A1 | 6/2004 | Kisters | 2005/0171746 A1 | 8/2005 | Thalhammer-Reyero |
| 2004/0117769 A1 | 6/2004 | Lauzon | 2005/0198086 A1 | 9/2005 | Moore et al. |
| 2004/0123277 A1 | 6/2004 | Schrader et al. | 2005/0198125 A1 | 9/2005 | Beck et al. |
| 2004/0139400 A1 | 7/2004 | Allam et al. | 2005/0198247 A1 | 9/2005 | Perry et al. |
| 2004/0146199 A1 | 7/2004 | Berkner et al. | 2005/0210263 A1 | 9/2005 | Levas et al. |
| 2004/0148178 A1 | 7/2004 | Brain | 2005/0223063 A1 | 10/2005 | Chang et al. |
| 2004/0148514 A1 | 7/2004 | Fee et al. | 2005/0223320 A1 | 10/2005 | Brintzenhofe et al. |
| 2004/0148571 A1 | 7/2004 | Lue | 2005/0246304 A1 | 11/2005 | Knight et al. |
| 2004/0162741 A1 | 8/2004 | Flaxer et al. | 2005/0257148 A1* | 11/2005 | Goodman et al. ........... 715/534 |
| 2004/0163041 A1 | 8/2004 | Engel | 2005/0262112 A1 | 11/2005 | Moore |
| 2004/0163046 A1 | 8/2004 | Chu et al. | 2005/0268217 A1* | 12/2005 | Garrison ...................... 715/505 |
| 2004/0172442 A1 | 9/2004 | Ripley | 2005/0268222 A1 | 12/2005 | Cheng |
| 2004/0181543 A1 | 9/2004 | Wu et al. | 2006/0010386 A1 | 1/2006 | Khan |
| 2004/0181711 A1* | 9/2004 | Johnson et al. ............... 714/47 | 2006/0020586 A1 | 1/2006 | Prompt et al. |
| 2004/0186762 A1 | 9/2004 | Beaven et al. | 2006/0026500 A1* | 2/2006 | Qa'Im-maqami ......... 715/506 |
| 2004/0189708 A1 | 9/2004 | Larcheveque et al. | 2006/0026534 A1 | 2/2006 | Ruthfield et al. |
| 2004/0189716 A1 | 9/2004 | Paoli et al. | 2006/0031757 A9 | 2/2006 | Vincent, III |

| | | | |
|---|---|---|---|
| 2006/0036995 | A1 | 2/2006 | Chickles et al. |
| 2006/0041838 | A1 | 2/2006 | Khan |
| 2006/0059107 | A1 | 3/2006 | Elmore et al. |
| 2006/0059434 | A1 | 3/2006 | Boss et al. |
| 2006/0069605 | A1 | 3/2006 | Hatoun |
| 2006/0069985 | A1 | 3/2006 | Friedman et al. |
| 2006/0075245 | A1 | 4/2006 | Meier |
| 2006/0080657 | A1 | 4/2006 | Goodman |
| 2006/0085409 | A1 | 4/2006 | Rys et al. |
| 2006/0101037 | A1 | 5/2006 | Brill et al. |
| 2006/0101051 | A1 | 5/2006 | Carr et al. |
| 2006/0107206 | A1* | 5/2006 | Koskimies .................. 715/523 |
| 2006/0129583 | A1 | 6/2006 | Catorcini et al. |
| 2006/0129978 | A1 | 6/2006 | Abriani et al. |
| 2006/0136422 | A1* | 6/2006 | Matveief et al. .............. 707/10 |
| 2006/0143220 | A1 | 6/2006 | Spencer, Jr. |
| 2006/0155857 | A1 | 7/2006 | Feenan et al. |
| 2006/0161559 | A1 | 7/2006 | Bordawekar et al. |
| 2006/0161837 | A1* | 7/2006 | Kelkar et al. ................ 715/505 |
| 2006/0184393 | A1 | 8/2006 | Ewin et al. |
| 2006/0195413 | A1 | 8/2006 | Davis et al. |
| 2006/0200754 | A1 | 9/2006 | Kablesh et al. |
| 2006/0230363 | A1 | 10/2006 | Rapp |
| 2006/0248468 | A1 | 11/2006 | Constantine et al. |
| 2007/0005611 | A1 | 1/2007 | Takasugi et al. |
| 2007/0036433 | A1 | 2/2007 | Teutsch |
| 2007/0050719 | A1 | 3/2007 | Lui et al. |
| 2007/0061467 | A1 | 3/2007 | Essey |
| 2007/0061706 | A1 | 3/2007 | Cupala |
| 2007/0074106 | A1 | 3/2007 | Ardeleanu |
| 2007/0088554 | A1* | 4/2007 | Harb et al. .................. 704/257 |
| 2007/0094589 | A1 | 4/2007 | Paoli |
| 2007/0100877 | A1 | 5/2007 | Paoli |
| 2007/0101280 | A1 | 5/2007 | Paoli |
| 2007/0118538 | A1* | 5/2007 | Ahern et al. ................ 707/100 |
| 2007/0118803 | A1 | 5/2007 | Walker et al. |
| 2007/0130500 | A1 | 6/2007 | Rivers-Moore et al. |
| 2007/0130504 | A1 | 6/2007 | Betancourt et al. |
| 2007/0186157 | A1 | 8/2007 | Walker et al. |
| 2007/0208606 | A1 | 9/2007 | Mackay et al. |
| 2007/0208769 | A1 | 9/2007 | Boehm et al. |
| 2007/0276768 | A1 | 11/2007 | Pallante |
| 2008/0021916 | A1 | 1/2008 | Schnelle et al. |
| 2008/0028340 | A1 | 1/2008 | Davis |
| 2008/0126402 | A1* | 5/2008 | Sikchi et al. ................ 707/102 |
| 2008/0134162 | A1 | 6/2008 | James |
| 2009/0070411 | A1 | 3/2009 | Chang et al. |
| 2009/0119580 | A1 | 5/2009 | Rohrabaugh et al. |
| 2009/0138389 | A1 | 5/2009 | Barthel |
| 2009/0177961 | A1* | 7/2009 | Fortini et al. ................ 715/239 |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 63085960 | 4/1988 |
| JP | 401173140 | 7/1989 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10171662 | 6/1998 |
| JP | 10207805 | 8/1998 |
| JP | 3191429 | 1/2000 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 9/2006 |

OTHER PUBLICATIONS

Cebeci et al., Tree View Editing Learning Object Metadata, Google 2005, pp. 99-108.*
Honkala et al., Multimodal Interaction with XForms, ACM 2006, pp. 201-208.*
Microsoft Corporation, "Microsoft Computer Dictionary" Microsoft Press, Fifth Edition, p. 149.
"Architecture for a Dynamic Information Area Control" IBM Technical Disclosure Bulletin IBM Corp. New York US vol. 37 No. 10 Jan. 10, 1994. pp. 245-246.
Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
Laura Acklen & Read Gilgen, "Using corel Wordperfect 9", 251-284, 424-434, 583-586 (1998).
Leblond et al, "PC Magazine Guide to Quattro Pro for Windows", pp. 9-11, 42-61, Ziff-Davis Press, Copyright 1993 by the LeBlond Group.
Microsoft Visual Basic 5.0 Programmer's Guide 1997; pp. 578-579;Redmond WA 98052-6399.
Excel 97 for Busy People Published by Osborne/Mcgraw-Hill 1997 pp. 48-50.
Rapaport L; "Get more from SharePoint" Transform Magazine vol. 11 No. 3. Mar. 2002 pp. 1315.
Musgrave S; "Networking technology—impact and opportunities" Survey and Statistical Computing 1996. Proceedings of the Second ASC International Conference. Sep. 1996. pp. 369-378. London UK.
McCright J.S.; "New Tool Kit to Link Groove with Microsoft Sharepoint" eWeek Enterprise News & Reviews Ziff Davis Media Inc. Jul. 29, 2002.
Description of Whitehill Composer software product producted by Whitehill Technologies Inc. available at <http://www.xml.com/pub/p/221> accessed on Apr. 8 2004, two pages.
Clark James—W3C Editor; "XSL Transformation (XSLT) Verison 1.0" Nov. 16, 1999 W3C (MIT INRIA Kejo) pp. 1-156.
Object Management Group, XML Metadata Interchange (XMI) Specification Version 1.2 Jan. 2002.
W3C Editor James Clark and Ste; "XML Path Language (XPath) Version 1.0" Nov. 16, 1999 W3C (MIT INRIA Kejo) pp. 1-49.
Staneck W., "Internal and External Media" Electronic Publishing Unleashed, 1995, Chapter 22, pp. 510-542.
Pike et al., "The Use of Name Spaces in Plan 9," Operating Systems Review vol. 27, No. 2, Apr. 1993, pp. 72-76.
Pike et al., "Plan 9 from Bell Labs" UKUUG, Summer 1990, 10 pages.
Peterson B. , "Unix Variants," Unix Review, vol. 10, No. 4, Apr. 1992, pp. 29-31.
Kobayashi et al., "An Update on BTRON-specification OS Development" IEEE 1991, pp. 132-140.
Herzner et al., "CDAM- Compound Document Access and Management. An Object-Oriented Approach" Multimedia Systems Interaction and Applications, 1992, Chapter 3, pp. 17-36.
DiLascia et al., "Sweeper" Microsoft Interactive Developer, vol. 1, No. 1, 1996, 27 pages.
Clapp D., "The NeXT Application Kit Part I: Non-Responsive Classes," The NeXT Bible 1990, Chapter 16, pp. 275-293.
Berg A., "Naming and Binding: Monikers" Inside OLE, 1995, Chapter 9, pp. 431-490.
Barker et al., "Creating In-Line Objects Within An Integrated Editing Environment," IBM Technical Disclosure Bulletin, vol. 27, No. 5, Oct. 1984, p. 2962.
"Store and Organize Related Project Files in a Binder," Getting Results with Microsoft Office, 1990, pp. 109-112.
Zdonik S., "Object Management System Concepts," ACM, 1984, pp. 13-19.
Trupin J., "The Visual Programmer," Microsoft Systems Journal, Apr. 1996, pp. 103-105.

Schmid et al., "Protecting Data from Malicious Software"; 18th Annual Computer Security Applications Conference; 2002; pp. 199-208.
Prevelakis et al., "Sandboxing Applications"; Proceedings of the FREENIX Track; 2001; pp. 119-126.
Sun Q. et al., "A robust and secure media signature scheme for JPEG images" Proceedings of 2002 IEEE Workshop on Multimedia Signal Processing, Dec. 2002, pp. 296-299.
Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.
"A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.
"Netscape Communicator's Collapsible Toolbars" CHI'98 Human Factors in Computing Systems Conference Proceedings Los Angeles CA Apr. 18-23, 1998 pp. 81-86.
"Flexible Information Presentation with XML" 1998 The Institution of Electrical Engineers 6 pages.
"Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
"XKvalidator: A Constraint Validator for XML" CIKM '-2 Nov. 4-9, 2002 Copyright 2002 ACM 1-58113-492-04/02/0011 pp. 446-452.
"Designing Valid XML Views" ER 2002 LNCS 2503 2002 Springer-Verlag Berlin Heidelberg 2002 pp. 463-477.
Efficient Management of Multiversion Documents by Object Referencing Proceedings of the 27th VLDB Conference 2001 pp. 291-300.
"Efficient schemes for managing mulitversion XML documents" VLBD Journal (2002) pp. 332-352.
"Storing and Querying Multiversion XML Documents using Durable Node Numbers" IEEE 2002 pp. 232-241.
"XML Document Versioning" SIGMOD Record vol. 30 No. 3 Spet 2001 pp. 46-53.
"Generic Validation of Structural Content with Parametric Modules" ICFP '01 Sep. 3-5, 2001 Copyright 2001 ACM 1-58113-415-0/01/0009 pp. 98-109.
"Managing Complex Documents Over the WWW: A Case Study for XML" IEEE Transactions on Knowledge and Data Engineering Vo.1. 11 No. 4 Jul./Aug. 1999. pp. 629-938.
"From small beginnings" Knowledge Management Nov. 2001 pp. 28-30.
"XML Editors: Allegations of Functionality in search of reality" Internet 'Online! 1999 XP002230082 retrieved from the Internet <URL:http://www.ivritype.com/xml/>.
"Photo Shop 5/5.5 WOW! Book" 2000 Peachpit Press pp. 8-17.
"XML Spy Tops as XML Editor" http://www.eweek.com/article2/0395972404100.asp Nov. 25, 2002 4 pages.
"Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.
"Mapping and Displaying Structural Transformations between XML and PDF" DocEng '02 Nov. 8-9, 2002 Copyright 2002 ACM 1-58113-597-7/02/0011 pp. 95-102.
"Tsbiff—tildeslash biff—version 1.2.1" Internet Document [Online] Jun. 1999 URL: http://web.archive.org/web/19990912001527/http://www.tildeslash.com/tsbiff/.
"Micro-Firewalls for Dynamic Network Security with Distributed Intrusion Detection"; IEEE INternational Symposium on Network Computing and Applications; 2001; pp. 68-79.
"Specifying Runtime Environments and Functionalities of Downloadable Components Under the Sandbox Mode"; International Symposium on Principles of Software Evolution; 2000; pp. 138-142.
"An Efficiently Updatable Index Scheme for Structured Documents" 1998 IEEE pp. 991-996.
"Immediate and Partial Validation Mechanism for the Conflict Resolution of Update Operations in XML Databases" WAIM 2002 LNCS 2419 2002 pp. 387-396 Springer-Veriag Berlin Heidelberg 2002.

"Validation with MSXML and XML Schema" Windows Developer Magazine Jan. 2002 pp. 35-38.
"SmartUpdate Developer's Guide" Online Mar. 11, 1999 retrieved from the Internet on Dec. 8, 2000: <http://developer.netscape.com:80/docs/manuals/communicator/jarman/index.htm> 83 pages.
"Netscape Communicator 4.61 for OS/2 Warp" Software 1999 The whole software release & "Netscape—Version 4.6 [en]-010615" Netscape Screenhot Oct. 2, 2002.
"A secure conditional access system using digital signature and encryption" 2003 Digest of Technical Papers. International Conference on Consumer Electronics Jun. 2003 pp. 220-221.
"Delphi 5 Developer's Guide" Sams Publishing 1999 Chapter 31 Section: Data Streaming 6 pages.
"Validating MPEG-21 Encapsulated Funational Metadata" IEEE 2002 pp. 209-212.
"XFIG Version 3.2 Patchlevel 2 (Jul. 2, 1998) Users Manual (Edition 1.0)" Internet Document [Online] Jul. 2, 1998 XP002229137 Retrieved from the Internet: <URL: http://www.ice.mtu.edu/online_docs/xfig332/> [retrieved on Jan. 28, 2003].
"An Efficient and Flexible Access Control Framework for Java Programs in Mobile Terminals"; 22nd International Conference on Distributed Computing Systems Workshops; 2002; pp. 777-782.
"XML: Not a Silver Bullet But a Great Pipe Wrench" Standardview vol. 6. No. 3 Sep. 1998 pp. 125-132.
"The Open Software Description Format" Online Aug. 13, 1997 retrieved from the Internet on Nov. 7, 2003: <http://www.w3.org/TR/NOTE-OSD> 11 pages.
"Bridging XML-Schema and relational databases. A System for generating and manipulating relational databases using valid XML documents." DocEng '01 Nov. 9-10, 2001 Coppyright 2001 ACM 1-58113-432-0/01/0011 pp. 105-114.
"The Component Object Model" A Technical Overview Oct. 1994 Microsoft Corp. pp. 1-14.
"Managing and Querying Multi-Version XML Data with Update Logging" DocEng '02 Nov. 8-9, 2002 Copyright 2002 ACM 1-58113-594-7/02/0011 pp. 74-81.
Han et al., WebSplitter: A Unified XML Framework for Multi-Device Collaborative Web Browsing, 2000, ACM Conference on Cimputer Supported Cooperative Work, 10 pages.
IBM: Stack Algorithm for Extractin Subtree from Serialized Tree, Mar. 1, 1994, TDB-ACC-NONN94033, 3 pages.
Altova et al. XML Spy, XML integrated Development Environments, Altova Inc., 2002, pp. 1-18.
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Altova, "User Reference Manual Version 4.4, XML Spy suite 4.4," Atova Ges.m.b.H & Altova, Inc., May 24, 2002, pages cover, Copyright page, 1-565.
Pacheco, Xavier et al., "Delphi 5 Developer's Guide", Sams Publishing. Chapter 31, Section: Data Streaming,(1999),4.
Ben-Natan, U.S. Appl. No. 60/203,081, filed May 9, 2000, entitled "Internet platform for creating and supporting communities".
Excel Developer Tip (hereinafter "Excel"), "Determining the Data Type of a Cell", May 13, 1998, p. 1 (available at http://jwalk.com/ss//excel/tips/tip62.htm).
Kutay, U.S. Appl. No. 60/209,713, filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives".
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP Portland Oregon*, (2000),101-111.
Watt, Andrew "MIcrosoft Office Infopath 2003 Kick Start", (*Published by Sams*) Print ISBN-10:0-672-32623-X, (Mar. 24, 2004),1-57.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997),pp. 42-43, 54-58.

"Microsoft Word 2000", Screenshots,(1999),1-5.

Beauchemin, Dave, "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew , et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo , "Running Microsoft Word 97", 314-315, 338, 361-362, 390, and 714-719.

Brabrand, et al., "Power Forms Declarative Client-side Form Field Validation", (2002),1-20.

Dubinko, Micah , "XForms and Microsoft InfoPath", Retrieved from the Internet at http://www.xml.com/lpt/a/1311 on Jan. 21, 2007,(Oct. 29, 2003).

Hoffman, Michael, "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro , et al., "A Dynamic User Interface for Document Assembly", Department of Computer Science, University of Helsinki,(Nov. 2002).

Nelson, Joe, "Client-side Form Validation Using JavaScript", *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan , "Microsoft InfoPath 2003 By Example", Retrieved from the Internet at http://www.perfectxml.com/InfoPath.asp on Jan. 21, 2007,(Apr. 20, 2003).

Udell, Jon, "InfoPath and XForms", Retrieved from the Internet at http://weblog.infoworld.com/udell/2003/02/26.html,(Feb. 26, 2003).

Altova, Inc., "XML Spy 4.0 Manual," Altova Inc. & Altova GmbH, coyright 1998-2001, Chapters 1, 2, and 6, encompassing pp. 1-17, 18-90, and 343-362.

Cybook, Inc.: "Copying the Search Form to Services-based Web Sites" INtemet Article, (online) Jul. 26, 2004.*the whole document*.

Macromedia, Inc.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document.

Anat, Eyal et al., "Integrating and Customizing Hererogeneous E-Commerce Applications", The VLDB Journal-The International Journal on Very Large Data Bases, vol. 10, Issue 1,(Aug. 2001),16-38.

Adams, Susie et al., "BizTalk Unleashed", Sams publishing, 2002, first printing Mar. 2001,1-2, 31-138.

Vasters, Clemens F., "BizTalk Server 2000 A Beginner's Guide", Osborne/McGraw-Hill,(2001),1-2, 359-402.

Halberg, Bruce et al., "Using Microsoft Excel 97", (1997),191-201, 213-219.

Villard, et al., "An Incremental XSLT Transformation Processor for XML Document Manipulation", http://wwww2002.org/CDROM/refereed/321, Printed on May 18, 2007,(May 2002),25 pages.

Cover, XML Forms Architecture, retrieved at << http://xml.coverpages.org/xfa.html>> on Aug. 17, 2006, Coverpages, Jun. 16, 1999.

Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.

Grosso, et al., "XML Fragment Interchange", W3C,(Feb. 2001),1-28.

Altova, et al., "User and Reference Manual Version 4.4", www.xmlspy.com, (May 24, 2007), 1-565.

"XForm 1.0", W3C,(Jul. 16, 2001).

"Webopedia Computer Dictionary" retrieved on May 9, 2006, at <<http://www.pewebopedia.com/TERM/O/OLE.html>>, Jupitermedia Corporation, 2006, pp. 07.

"Microsoft Word 2000 Screenshots", (2000),11-17.

XmlSpy, "XmlSpy 2004 Enterprise Edition Manual", Altova,(May 17, 2004),1-25, 220-225.

StylusStudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.

Kay, Michael "XSL Transfornmations (XSLT) Version 2.0", http://www.w3.org/TR/2005/WD-xslt20-20050404, (04/205),1-374.

"Non Final OA", U.S. Appl. No. 10/939,588, (Feb. 18, 2009),40 pages.

"Notice of Allowance", U.S. Appl. No. 10/404,312, (Jan. 12, 2009),12 pages.

"Final Office Action", U.S. Appl. No. 10/857,689, (Jan. 6, 2009),23 pages.

"Non Final Office Action", U.S. Appl. No. 10/977,198, Feb. 2, 2009),15 pages.

"Non Final Office Action", U.S. Appl. No. 10/939,588, (Feb. 18, 2009),40 pages.

"Non Final Office Action", U.S. Appl. No. 10/976,451, (Feb. 23, 2009),39 pages.

"Non final Office Action", U.S. Appl. No. 11/234,767 (Feb. 26, 2009),37 pages.

"Final Office Action",U.S. Appl. No. 10/916,692, (Nov. 16, 2009),10 pages.

"Final Office Action", U.S. Appl. No. 11/072 087, (Nov. 16, 2009),9 pages.

"Final Office Action", U.S. Appl. No. 11/218,149, (Nov. 16, 2009),18 pages.

"Foreign Office Action", Mexican Patent Application No. PA/a/2006/002493, (Sep. 14, 2009),3 pages.

"Non-Final Office Action", U.S. Appl. No. 11/036,910, (Nov. 13, 2009),9 pages.

"Notice of Allowance", U.S. Appl. No. 11/095,254, (Nov. 18, 2009),8 pages.

Van Hoff, Arthur et al., "The Open Software Description Format", Retrieved from: <www.w3.org/TR/NOTE-OSD> on May 18, 2009, (Aug. 13, 1997),10 pages.

"Notice of Allowance", U.S. Appl. No. 11/167,514, (Mar. 11, 2009),6 pages.

"Non Final Office Action", U.S. Appl. No. 10/942,528, (Mar. 6, 2009),31 pages.

"Non Final Offfice Action", U.S. Appl. No. 11/170,521, (Jan. 21, 2009),86 pages.

"Foreign Office Action", Application Serial No. 2,412,611, (Feb. 9, 2009),6 pages.

"Foreign Office Action", Application Serial No. 200610003709.2, (Jan. 09, 2009),8 pages.

"EP Office Action", Application Serial No. 06111546.5, (Oct. 15, 2008),5 pages.

"Notice of Re-Examination", Application Serial No. 01813138.7, (Mar. 11, 2009),27 pages.

"Notice of Allowance", U.S. Appl. No. 10/988,718, (Apr. 9, 2009).

"Final Office Action", U.S. Appl. No. 11/107,347, (Apr. 2, 2009),15 pages.

"Restriction Requirement", U.S. Appl. No. 11/227,550, (Apr. 2, 2009),8 pages.

"Non Final Office Action", U.S. Appl. No. 10/955,665, (Apr. 2, 2009),19 pages.

"Non Final Office Action", U.S. Appl. No. 10/988,720, 19 pages.

"Final Office Action", U.S. Appl. No. 11/203,818, (Apr. 14, 2009),31 pages.

"Final Office Action", U.S. Appl. No. 11/044,106, (Apr. 13, 2009),20 pages.
"Final Office Action", U.S. Appl. No. 11/226,044, (Apr. 20, 2009),24 pages.
"Final Office Action", U.S. Appl. No. 11/056,500, (Apr. 16, 2009),10 pages.
"Final Office Action", U.S. Appl. No. 11/203,937, (May 7, 2009),13 pages.
"Non Final Office Action", U.S. Appl. No. 10/955,666 (May 7, 2009),28 pages.
"Non Final Office Action", U.S. Appl. No. 10/916,692, (Apr. 30, 2009),14 pages.
"HP Blade Sever BH Series Operating System Guide", Hewlett-Packard (Jul. 2002).
Acklen, et al., "Special Edition, Using Corel WordPerfect 9", Que Corporation,,(June 199(),pp. 251-284, 424-434, 583-585.
"Non Final Office Action", U.S. Appl. No. 11/295,178, (May 27, 2009),111 pages.
"Non-Final Office Action", U.S. Appl. No. 11/036,910, (Jun. 1, 2009),15 pages.
"Non Final Office Action", U.S. Appl. No. 10/857,689, (Jun. 11, 2009),25 pages.
"Non Final Office Action", U.S. Appl. No. 11/095,254, (Jun. 8, 2009),21 pages.
"Final Office Action", U.S. Appl. No. 11/234,767, (Jun. 10, 2009),24 pages.
"Foreign Office Action", Application Serial No. 2002-503702, Final Notice of Rejection,(Jun. 5, 2009),212 pages.
Iwantani, Kaori et al., "Perfect Manual of Clarisworks 4.0 for Macintosh", *1st Edition*, Japan, (Jul. 22, 1997),pp. 153-167.
Matsushita, Noriko "Step-up Training of Clarisworks (Tabulation), Successful Use of Spreadsheet and Tabulation", *Mac People*, vol. 4, No. 19, (Oct. 1, 1998),pp. 138-139.
Senda, Akihiro "Word 2000, Conservative- Looking but 'Attentive' New Function", *Nikkei PC 21*, vol. 4, No. 8; Japan, (Aug. 1, 1999),pp. 115-116.
Fukuhara, Yasuji "Clarisworks, Introduction to Business Document Construction, No. 4, Estimate", *Nikkei Mac*, No. 14; Japan, (May 17, 1994),pp. 197-204.
"Final Office Action", U.S. Appl. No. 10/976,451 (Jul. 2, 2009), (May 4, 2006),22 pages.
Reagan, Moore W., et al., "Collection-based persistent digital archives", U.S. Appl. No. 60/191,662, filed Mar. 23, 2000, 133.
"Non-Final Office Action", U.S. Appl. No. 11/227,550, (Aug. 3, 2009),45 pages.
"Notice of Allowance", U.S. Appl. No. 11/203,937, (Aug. 3, 2009),107 pages.
"Foreign Office Action", Application Serial No. 200610051554.X, (Jul. 10, 2009),11 pages.
"Non-Final Office Action", U.S. Appl. No. 11/234,767, (Feb. 2, 2006),150 Pages.
"Advisory Action", U.S. Appl. No. 10/942,528, (Oct. 26, 2009),3 pages.
"Final Office Action", U.S. Appl. No. 10/402,640, (Aug. 28, 2009),17 pages.
"Final Office Action", U.S. Appl. No. 10/942,528, (Sep. 17, 2009),27 pages.
"Final Office Action", U.S. Appl. No. 10/955,666, (Oct. 14, 2009),24 pages.
"Final Office Action", U.S. Appl. No. 11/170,521, (Sep. 8, 2009),12 pages.
"Final Office Action", U.S. Appl. No. 10/977,198, (Aug. 19, 2009),15 pages.
"Non-Final Office Action", U.S. Appl. No. 10/939,588, (Aug. 27, 2009),28 pages.
"Non-Final Office Action", U.S. Appl. No. 10/976,451, (Oct. 29, 2009),14 pages.
"Non-Final Office Action", U.S. Appl. No. 11/044,106, (Sep. 24, 2009),17 pages.
"Non-Final Office Action", U.S. Appl. No. 11/107,347, (Sep. 17, 2009),9 pages.
"Non-Final Office Action", U.S. Appl. No. 11/557,931, (Oct. 20, 2009),27 pages.
"Non-Final Office Action", U.S. Appl. No. 11/567,149, (Sep. 8, 2009),5 pages.
"Notice of Allowance", U.S. Appl. No. 10/955,665, (Nov. 3, 2009),8 pages.
"Notice of Allowance", U.S. Appl. No. 10/988,720, (Sep. 17, 2009),18 pages.
"Notice of Allowance", U.S. Appl. No. 11/203,937, (Aug. 31, 2009),2 pages.
"Notice of Allowance", U.S. Appl. No. 11/203,937, Supplemental,(Sep. 15, 2009),2 pages.
"Final Office Action", U.S. Appl. No. 11/557,931, (Feb. 26, 2010),8 pages.
"Final Office Action", U.S. Appl. No. 11/227,550, (Jan. 19, 2010),12 pages.
"Final Office Action", U.S. Appl. No. 11/234,767, (Jan. 26, 2010),23 pages.
"Final Office Action", U.S. Appl. No. 11/295,178, (Dec. 24, 2009),38 pages.
"Foreign Office Action", Application Serial No. 200610051544.X, (Dec. 4, 2009),9 pages.
"Issue Notification", U.S. Appl. No. 11/095,254, (Feb. 10, 2010),1 page.
"Issue Notification", U.S. Appl. No. 11/276,585, (Jan. 21, 2009),1 page.
"Non-Final Office Action", U.S. Appl. No. 10/402,640, (Dec. 30, 2009),16 pages.
"Non-Final Office Action", U.S. Appl. No. 11/170,521, (Dec. 17, 2009),11 pages.
"Non-Final Office Action", U.S. Appl. No. 11/218,149, (Jan. 14, 2010),15 pages.
"Non-Final Office Action", U.S. Appl. No. 12/021,894, (Dec. 31, 2009),10 pages.
"Notice of Allowance", U.S. Appl. No. 10/942,528, (Dec. 3, 2009),8 pages.
"Notice of Allowance", U.S. Appl. No. 11/056,500, (Dec. 2, 2009),17 pages.
"Notice of Allowance", U.S. Appl. No. 11/072,087, (Feb. 23, 2010),4 pages.
"Notice of Allowance", U.S. Appl. No. 11/872,703, (Jan. 27, 2010),19 pages.
"Supplemental Notice of Allowance", U.S. Appl. No. 10/955,665, (Dec. 30, 2009),2 pages.
"Supplemental Notice of Allowance", U.S. Appl. No. 10/955,665, (Feb. 4, 2010),2 pages.
"Supplemental Notice of Allowance", U.S. Appl. No. 10/955,665, (Nov. 27, 2009),2 pages.

* cited by examiner

200

202

| Reference No. | | Date Ordered | |
| Charge To | | Date Requested | |

Submitted By

| Name | | Address 1 | |
| ID Number | | Address 2 | |
| Email Address | | City | |
| Telephone # | | State/Province | |
| | | Zip/Postal Code | |
| | | Country/Region | |

Fig. 2

METHODS AND SYSTEMS FOR SERVER SIDE FORM PROCESSING

TECHNICAL FIELD

This invention relates to methods and systems for exchanging and rendering forms on computing devices.

BACKGROUND

Conventional form-rendering systems, such as those that render HTML forms, utilize a simple protocol to communicate between a client device on which the form is rendered and manipulated by a user, and a server that processes and provides data for rendering on the client device. More specifically, client devices in this type of environment typically send data to the server in the form of name-value pairs. The name portion of the name-value pair corresponds to a particular control in the form (such as a field in which the user might enter their name or address), and the value portion of the name-value pair corresponds to data that appears in a control.

Typically, the server has been responsible for figuring out which data has changed and then, responsively, taking the appropriate action such as modifying the form, and then returning HTML data to the client device which can then be rendered for the user.

This simple protocol leaves much to be desired and has many shortcomings not the least of which include the inability to provide or support a rich, dynamic user experience, the inability to scale in a desirable manner, and taxing server resources.

SUMMARY

Various embodiments can efficiently utilize form server resources by, in at least some embodiments, acting only on one tree during the form editing process. Various embodiments can act on a form's data and not necessarily a representation of the form's view. The described embodiments can support various different presentation formats

BRIEF DESCRIPTION OF THE DRAWINGS

FIG. 2 illustrates an exemplary form that is described in the context of one or more embodiments.

DETAILED DESCRIPTION

Overview

Figure 1:
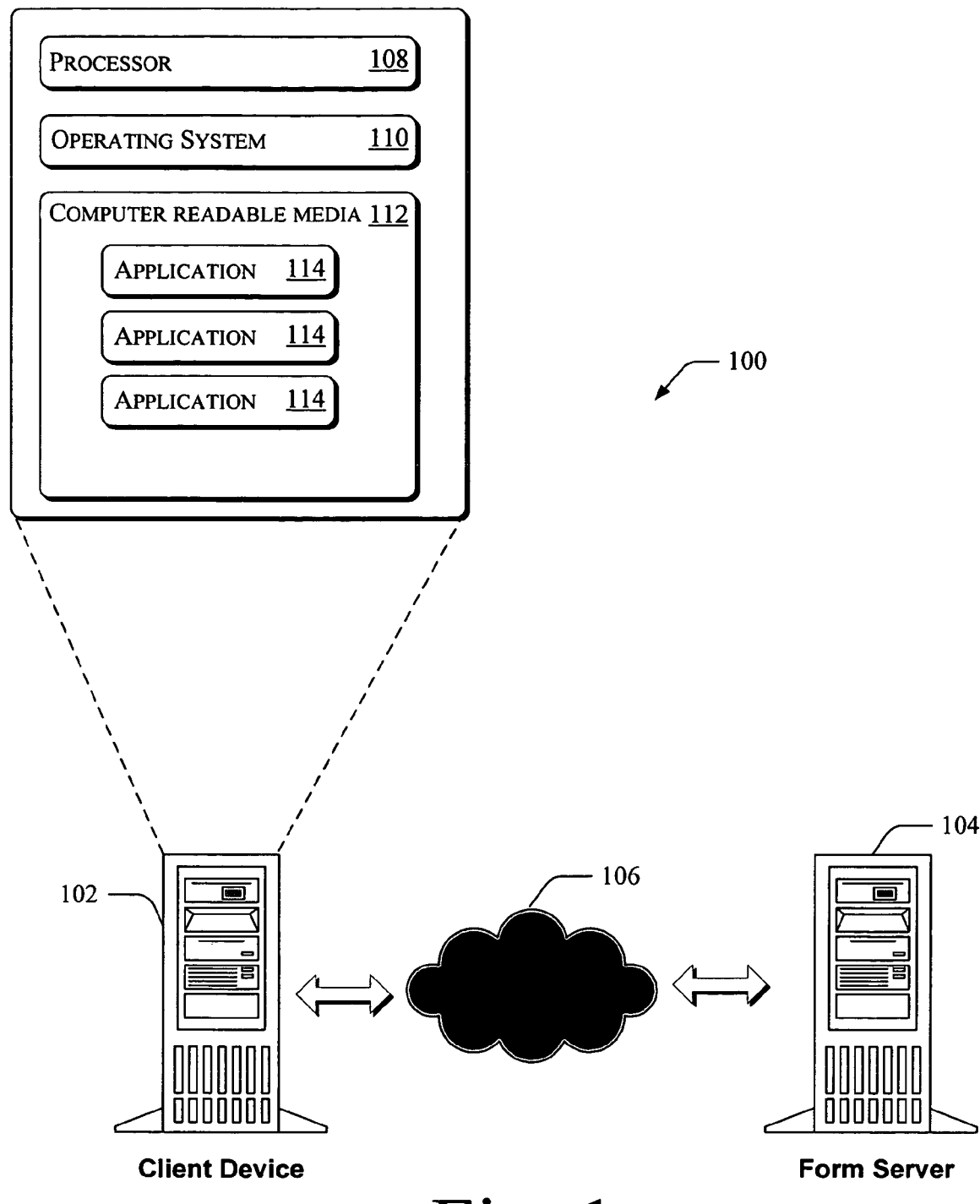
FIG. 1 illustrates an exemplary client/server computing environment in connection with which various embodiments can be implemented.

Various embodiments described below can support a richly dynamic form environment that permits editing on the client side and can alleviate many of the server-imposed processing complexities that have existed in the past. In at least some embodiments, complex editing scenarios permit users to make complex editing changes on a form, and have those editing changes captured and rendered on the client side for later communication to the server. Particular aspects of at least some of the embodiments described below can permit scalability, and can, in at least some instances, be employed in the context of a wide variety of browsers having different levels of capability, e.g. "thin" and "thick" browsers.

Exemplary Computing Environment

Preliminarily, the embodiments about to be described can be utilized in connection with a client/server computing environment, such as the one shown generally at 100. Environment 100 includes, in this example, a client computing device 102 that communicates with one or more servers 104 which, in this example can comprise form servers.

In the illustrated and described embodiment, computing device 102 communicates with server(s) 104 via a communication network 106, such as an intranet or the Internet. Computing device 102 comprises at least one or more processors 108, an operating system 110, one or more computer-readable media 112 and one or more applications 114 embodied on the computer-readable media 112. A more detailed description of an exemplary computing device appears at the end of this document under the heading "Exemplary Computing Device".

In this particular example, one of application 114 comprises a user agent such as a web browser. The user agent allows a user to interact with a form that is provided by form server 104. In the context of a user agent that comprises a web browser, the user agent enables a user to access the Internet and interact with form server 104 to receive and edit a form.

It is to be appreciated and understood that other well-known computing systems, environments, and/or configurations can be utilized in connection with the embodiments that are about to be described. For example, such computing systems, environments and/or configurations can include, without limitation, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

The embodiments about to be described can be described in the general context of, or implemented with, computer-executable instructions, such as program modules, executed by one or more computers or other devices. Generally, program modules include routines, programs, objects, components, data structures and etc. that perform particular tasks or implement particular abstract data types. The functionality of the program modules may be combined or distributed in various embodiments, including those described below.

These computer-executable instructions can comprise or be embodied on computer-readable media 112 which can comprise, for example, computer storage media and communication media. Computer storage media includes volatile and nonvolatile, removable and non-removable media implemented in any method or technology for storage of information. This stored information can comprise computer-readable instructions, data structures, program modules, and other data. Computer storage media comprise, by way of example, RAM, ROM, EEPROM, flash memory or other memory technology, CD-ROM, digital versatile disks (DVDs) or other optical storage, magnetic media storage devices, or any other medium that can be used to store the desired information.

Communication media typically embodies computer-readable instructions, data structures, program modules, or other data in a modulated data signal (e.g., a carrier wave or other transport mechanism) and includes any information delivery media. The term "modulated data signal" means a signal that has one or more of its characteristics set or changed in such a manner as to encode information in the signal. Communication media can comprise, for example, wired media, such as a wired network or direct-wired connection, and wireless media, such as acoustic, RF, infrared, and other wireless media. Combinations of any of the above can also be included within the scope of computer-readable media.

Capturing User Form Modifications

In at least one embodiment, when a user interacts with a particular form, a user agent executing on the client device keeps track of the changes made to the form, as well as the order of the changes or events that are generated by the user's interaction. The user agent can then, periodically, communicate those changes, in the order that the changes occurred, to the appropriate form server for processing. In at least some embodiments, the user agent can make the changes directly on the form that the user interacts with. For example, if a user manipulates the structure of the form, at least some user agents can implement the structural change and then, at some later time communicate those changes to the server for processing.

When the form server receives the changes, the server can then process the changes and send appropriate data to the client device for rendering. More specifically, when the server receives the data that describes the user-made changes and the order in which the changes were made to a form served up by the server, the server can process the data to produce processed data that can be sent to the client device and used to render an updated form on the client device. Examples of how this can be done are described below.

In at least one embodiment, only the changes are sent to the server, rather than all of the data associated with the entire form and its controls. In turn, server resources and overhead are conserved because the server does not have to process data that is unassociated with the changes or modifications that the user made to the form.

As an example, consider FIG. 2 which shows an exemplary form 200 in the form of a web form that a user might access at a web site when, for example, attempting to place an order for a particular product. In this example, form 200 includes a number of controls, one of which is indicated at 202 in the form of a "Date Ordered" field in which the user can enter the date that a particular order is submitted. Assume also that the user has used this web site before and is known (along with their pertinent billing information) to the site. In this example, the only new information that might be entered in the form is information that is entered into the "Reference No.", "Date Ordered" and "Date Requested" fields. That is, assume that form 200 populates the form with the information that it already maintains for a particular user and that when the web site processes a particular form, it knows who sent the form.

In accordance with at least one embodiment, only the form changes (and the order in which they occur) are communicated to the server. That is, there are a number of controls whose associated information does not change. In this case, information associated with those controls is not communicated to the server. Hence, in this example, only information associated with the controls "Reference No.", "Date Ordered" and "Date Requested" is eventually communicated to the server.

Consider further that the user wishes to modify the structure of the form in some way. For example, assume that the user wishes to insert an additional address control (e.g. "Address 3"). In the present embodiment, the user can manipulate the structure of the form and have those manipulations tracked and implemented by the user agent which, in this example, is a web browser. Eventually, as will be discussed, those manipulations as well as other changes to the form can be articulated to the server so that the server can provide updated data back to the client device for rendering.

The Event Log

Although the user agent can maintain the user-induced modifications of a particular form in any suitable structure, in at least one embodiment, the agent maintains an event log which maintains a list of changes or events that have occurred. Periodically, the user agent articulates the event log to the server so that the server can process the event log as described in more detail below. By maintaining the list of changes and/or events on the client device, the client device can implement the changes in a generally contemporaneous manner to provide the user with almost immediate feedback, without necessarily having to communicate with the server to affect the changes. In this way, the user can see their changes implemented without the changes being affected by the communication latency between the client device and the server. In addition, because the changes or events can be tracked and then periodically provided to the server, the server is not called upon to process, in a piecemeal manner, every single change that the user makes every time they make a change or generate an event. Hence, this approach can conserve server processing resources.

In the illustrated and described embodiment, the event log is structured in a format that is powerful and extensible enough to support arbitrary editing actions. This enables the browser, in at least some instances, to support such editing actions without having to communicate with the server. In the illustrated and described embodiment, the event log can naturally scale to the capabilities of a particular browser. For browsers that are less functional (i.e. "thin" browsers), there is typically more frequent communication with a particular server. An example of this is given below. For browsers that are more functional, there is typically less frequent communication with a particular server and hence, the event logs can be longer.

Figure 3:
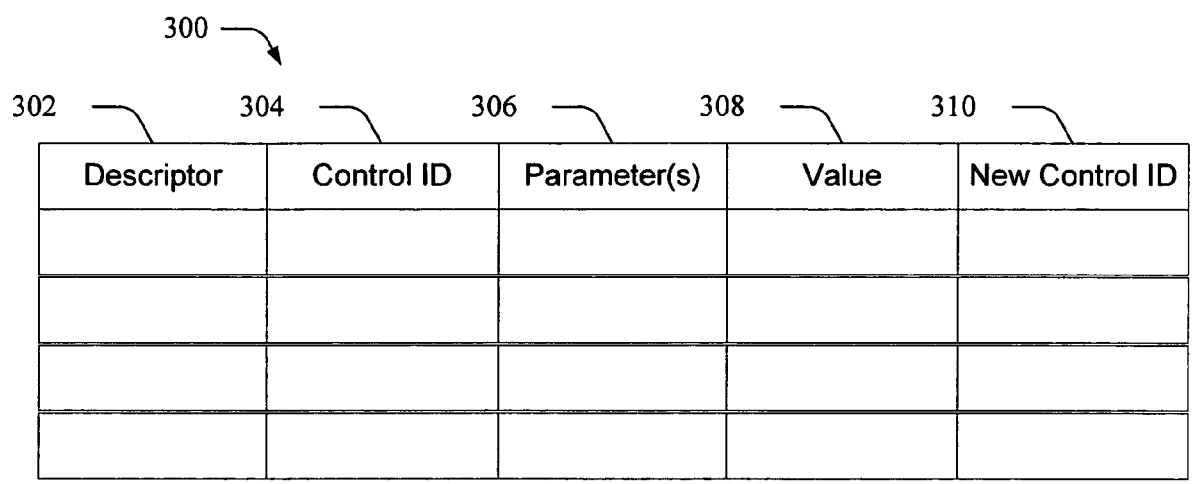
FIG. 3 illustrates an exemplary event log in accordance with one embodiment.

FIG. 3 illustrates an exemplary event log in accordance with one embodiment, generally at 300. In this example, the event log contains a number of fields. For example, a descriptor field 302 contains a descriptor or command for a particular action that a user takes. Examples of descriptors include, by way of example and not limitation, the following:

| | |
|---|---|
| XCollectionInsert(containerId, beforeSiblingId, newControlId) | Performs an insertion of a new control. |
| XCollectionInsertBefore(containerId, beforeSiblingId, newControlId) | Performs an insertion of a new control. |
| XCollectionInsertAfter(containerId, afterSiblingId, newControlId) | Performs an insertion of a new control. |
| XOptionalInsert(containerId, beforeSiblingId, newControlId) | Performs an insertion of a new control. |
| XCollectionRemove(controlId) | Removes a single item of a repeating collection. |
| XCollectionRemoveAll(controlId) | Removes all items of a repeating collection. |
| XOptionalRemove(controlId) | Removes an optional item. |
| VerifyChange(controlId, expectedValue) | Implicit Change: verifies that a client-side change that was caused by a side-effect was also triggered on the server. |
| VerifyValidation(controlId, expectedErrors) | Declarative validation: verifies that a validation error triggered by the client was also triggered by the server. |

A control ID field 304 contains values associated with the identifier for a control to which the editing action is to be applied. A parameters field 306 includes the parameters for a particular editing action. For example, some editing actions may require a text string to be inserted for a particular editing action. In this case, the parameters field would include a text string value. Another example would be a button click, in which case the parameters would include the button id and the button's current container. Yet another example would be an insertion of a new control, where the parameters would include a container for insertion, relative sibling and a name for a new control.

A value field 308 maintains entries associated with new control values. This assists the server in maintaining the state of the controls throughout a user's editing actions. A new control ID field 310 is provided and, if new controls are created by the user because of an editing action, holds an identifier for the new control. This permits subsequent entries in the event log to refer to the new control(s).

It is to be appreciated and understood that the exemplary event log illustrated in FIG. 3 is not to be used to limit application of the claimed subject matter. Rather, other event logs can be utilized without departing from the spirit and scope of the claimed subject matter.

Exemplary Method

Figure 4:
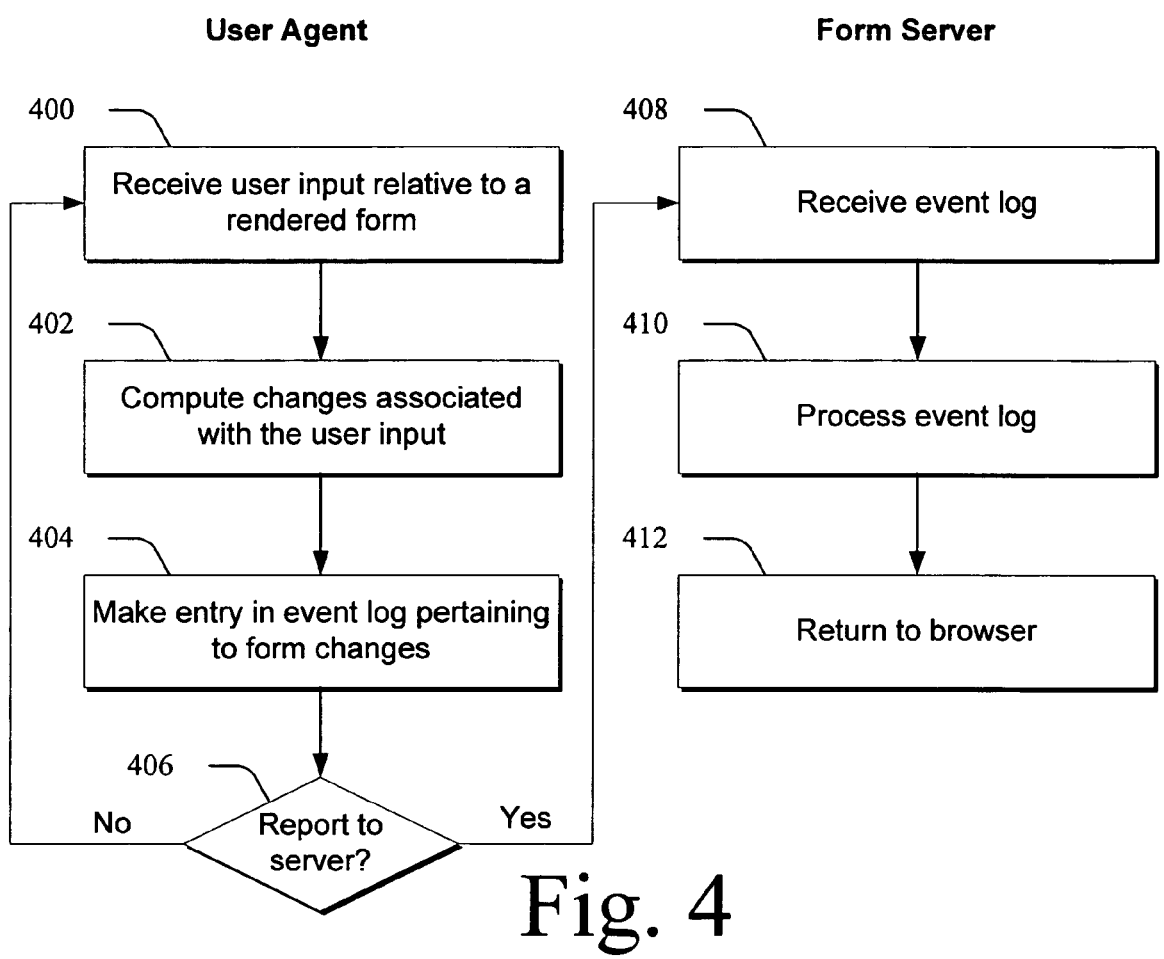
FIG. 4 is a flow diagram that describes steps in the method in accordance with one embodiment.

FIG. 4 is a flow diagram that describes steps in a method in accordance with one embodiment. The method can be implemented in connection with any suitable hardware, software, firmware or combination thereof. In but one embodiment, and as diagrammatically indicated, some aspects of the described method can be implemented in connection with a suitably configured user agent such as a web browser, and other aspects of the described method can be implemented in connection with a suitably configured form server.

Step 400 receives user input relative to a rendered form. The user input can be received in any suitable form. For example, the user may type a text string into a field associated with a particular control, the user can click on a particular control and the like. Step 402 computes changes to the form associated with the received input and implements the changes on the form. The changes can involve, for example, modifications to the controls or data fields associated with the control or, in at least some embodiments, can involve changing, in some way, the structure of the form. For example, the user may wish to add a column or row to a particular table on the form. Alternately or additionally, the user may wish to add a button or some other type of control to a particular form. In this case, step 402 would compute the form change and implement the change on the form.

Step 404 makes an entry in an event log that pertains to the form changes spawned by the user's input. It is to be appreciated and understood that the entries in the event log are made serially and track the input provided by the user. That is, the entries in the event log capture the nature of the changes and the order in which the changes occur. But one example of an event log is provided above in FIG. 3.

Step 406 ascertains whether the event log should be reported to the server. Any suitable criteria can be utilized to ascertain whether the event log should be sent to the server. For example, some browsers may have a practical size limit on the size of the event log. In this case, when the size of the event log reaches some threshold, it can be sent to the server. Alternately or additionally, some browsers may be "thin" browsers in the sense that they need to communicate with the server frequently because, for example, they may not be able to implement certain changes that the user desires to make. For example, some browsers may not be able to make structural changes to a particular form. In this case, these thin browsers can maintain an event log and, when a desired user action cannot be performed by the browser, the browser can send the event log, along with an indication of the desired action to the server. Alternately or additionally, there may be a lack of sufficient information on the client device such that the event log should be reported to the server. For example, a user may trigger an action that requires a database lookup; or a user may trigger a calculation for which all data is not available. Alternately or additionally, the user may make a change to the form that radically alters the presentation in which case some browsers may not be able to implement the change. Alternately or additionally, in some cases, browsers may not be able to implement advanced functionality, such as spellchecking and the like in which case, the event log might be reported to the server.

If, depending on whatever criterion is used, the event log need not be reported to the server, then the method returns to step 400. If, on the other hand, the event log is to be reported to the server, then the method reports the event log to the server (following the "Yes" branch in the figure).

Step 408, performed by the server, receives the event log that is reported from the browser. Step 410 processes the event log and step 412 returns data to the browser that can be used to render the form.

The event log can be processed by the server in any suitable way. For example, in one embodiment, when the server receives the event log, it can return back HTML to the browser that is utilized to render the view that the user sees. Alternately, the server can process the event log and return back data for the appropriate controls that are to be rendered by the browser. For example, in the case of a "thin" browser, the server might return all of the HTML that is to be processed and used to render the form on the client device. Alternately, for robust browsers that possess robust functionality, the server may just return the appropriate data associated with the appropriate controls that are to be rendered.

From a practical standpoint and in connection with one embodiment, once the server receives the event log, it first parses the event log into individual events and invokes the appropriate form for each event. In this embodiment, the forms are based on XML data. Accordingly, the server instantiates the form's XML DOM in memory, and then processes each event. For each event, the control has an identification or ID (as noted in the event log above). The control ID for a particular event is processed and mapped onto a corresponding node in the XML DOM. The server then performs the operation indicated in the event log entry. This provides modified XML data which reflects the modifications made by the user.

When the processing is finished insofar as event log entries are concerned, the resultant XML data can either be processed, as by applying suitable transforms to the XML data, to recreate the form view HTML which is sent to the browser (in the event of "thin browsers"), or the actual data for the associated controls can be sent to the browser (in the event of "thick" browsers).

Data-Centric XML Form Processing

In at least one embodiment, the form server can process the XML data and implement the user's editing actions by acting directly upon the data without having to instantiate and maintain synchrony between two different trees—typically referred to as a "view tree" and a "data tree". This constitutes an improvement over past "two-tree" approaches by conserving server resources and enhancing the flexibility of the system. Before considering the inventive approach, consider the following.

Typically, using a two tree approach, when the server, in this case an HTML form server, receives a request from a browser that contains form edits, a view tree that corresponds to the form is built in memory. The previous XML corresponding to the form is then loaded into a data tree. The view tree is then populated with the previous data values. Now, the previous values are compared with the new values for each control from the request that was sent by the browser. For each change that is found, the appropriate control is notified and the change is processed. This can include validating the values, invoking business logic, updating the data tree and the like. If the data tree changes such that the control needs to be updated, then the view tree is updated.

After all of this processing, an HTML representation of the view tree is rendered and sent as a response to the browser.

This approach can be inefficient in terms of utilization of the server's resources. That is, by using two trees, each of the trees has the editing actions performed on them. In addition, certain features may be invoked in response to changes in the view tree, while other changes may be invoked in response to changes in the data tree. Further, this approach inextricably ties the logic that might be invoked to a specific implementation or view of the form. As will be appreciated by the skilled artisan, this gives rise to inflexibilities insofar as presentation formats are concerned.

In accordance with at least one embodiment, an approach is adopted that eliminates the server's reliance on the view tree to implement editing changes. In the inventive approach, form changes are built, by the server, directly on the data itself. Because the logic that is applied to the changes is written on the data rather than on the HTML view, logic can be written to change the representation of the data without having to rewrite the data. This means that different presentation formats can be utilized which, in turn, enhances the flexibility of the overall system. More specifically, what this means is that the same form can run in different presentation environments—such as desk top environments, handheld device environments and the like. Furthermore, the same form can potentially run on different presentation platforms, for example, a browser versus a thick client versus a Powerpoint Presentation. That is, in at least some embodiments, the form can be rendered on different devices such as PDAs, telephones and the like, or using different presentation technologies such as WordML, XAML and the like.

In the illustrated and described embodiments, the functionality described above and below can be implemented using any suitable means. In at least some embodiments, such means comprises software that can reside on a particular server or form server.

Figure 5:
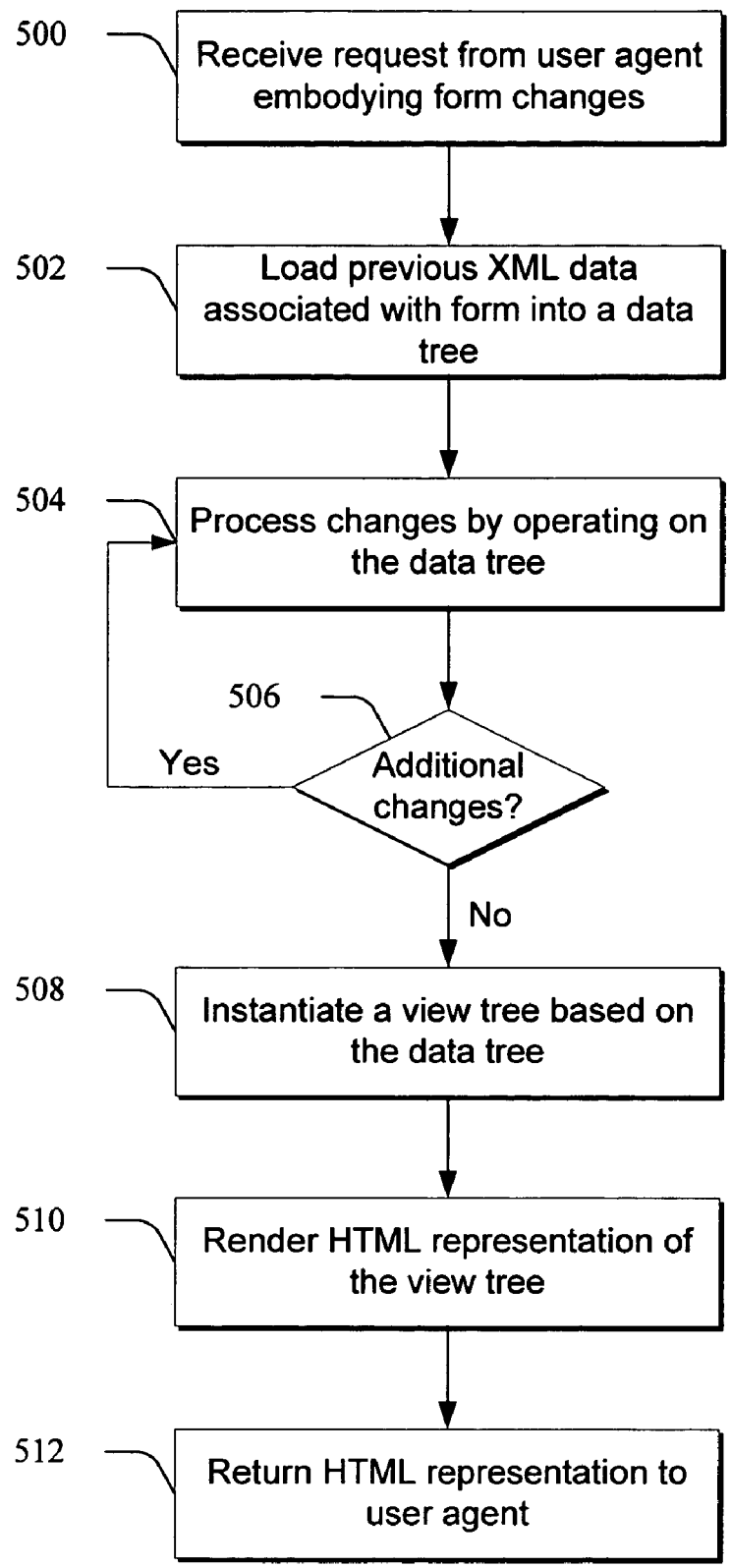
FIG. 5 is a flow diagram that describes steps in the method in accordance with one embodiment.

FIG. 5 is a flow diagram that describes steps in a method in accordance with one embodiment. The method can be implemented in connection with any suitable hardware, software, firmware or combination thereof. In but one embodiment, the method is implemented in software on a suitably configured form server.

Step 500 receives a request from a user agent embodying form changes. In but one embodiment, the user agent comprises a web browser. The request from the user agent can assume any suitable configuration. In but one embodiment, the changes are embodied in an event log, such as the event log described above. It is to be appreciated and understood, however, that the above-described event log constitutes but one exemplary change-transportation mechanism. As such, other transportation mechanisms can be utilized without departing from the spirit and scope of the claimed subject matter.

Step 502 loads previous XML data associated with the form into a data tree, and step 504 processes the changes by operating on the data tree. Notice in this embodiment, that the form changes and edits are made by operating on only one tree.

In embodiments in which the form changes are transported to the server in the form of an event log, step 504 can be performed as follows. Each entry in the event log is serially processed in the order in which it occurs. For each entry in the event log, this may mean that the change is validated, business logic is invoked and the like.

Step 506 ascertains whether there are any additional form changes. In the event log embodiments, this step can be performed by ascertaining whether there are any additional log entries. If there are additional event log entries, then the method returns to step 504. If, on the other hand, there are no additional changes to be made, step 508 instantiates a view tree (also referred to as a "control tree") based on the data tree. This step can be performed, for example, by applying a suitable template or transform to the data tree. Examples of templates can include, without limitation, XSL transforms and the like.

Consider now the flexibility provided by step 508. Because the above operations are performed on the data and not the view, the transforms that can applied to the data tree can flexibly accommodate different and diverse presentation environments.

Step 510 then renders an HTML representation of the view tree and step 512 returns the HTML representation to the user agent.

The above-describe approach can efficiently utilize server resources by, in at least some embodiments, acting only on one tree during the editing process. Additionally, because the described approach acts on the data and not on the view (or in other words is "data-centric"), various different presentation formats can be supported which, in turn, greatly enhances the flexibility of the system. Moreover, the described approach can seamlessly and efficiently incorporate structural changes into a form in a manner that the "two tree" approach simply can not.

Exemplary Computing Device

Figure 6:
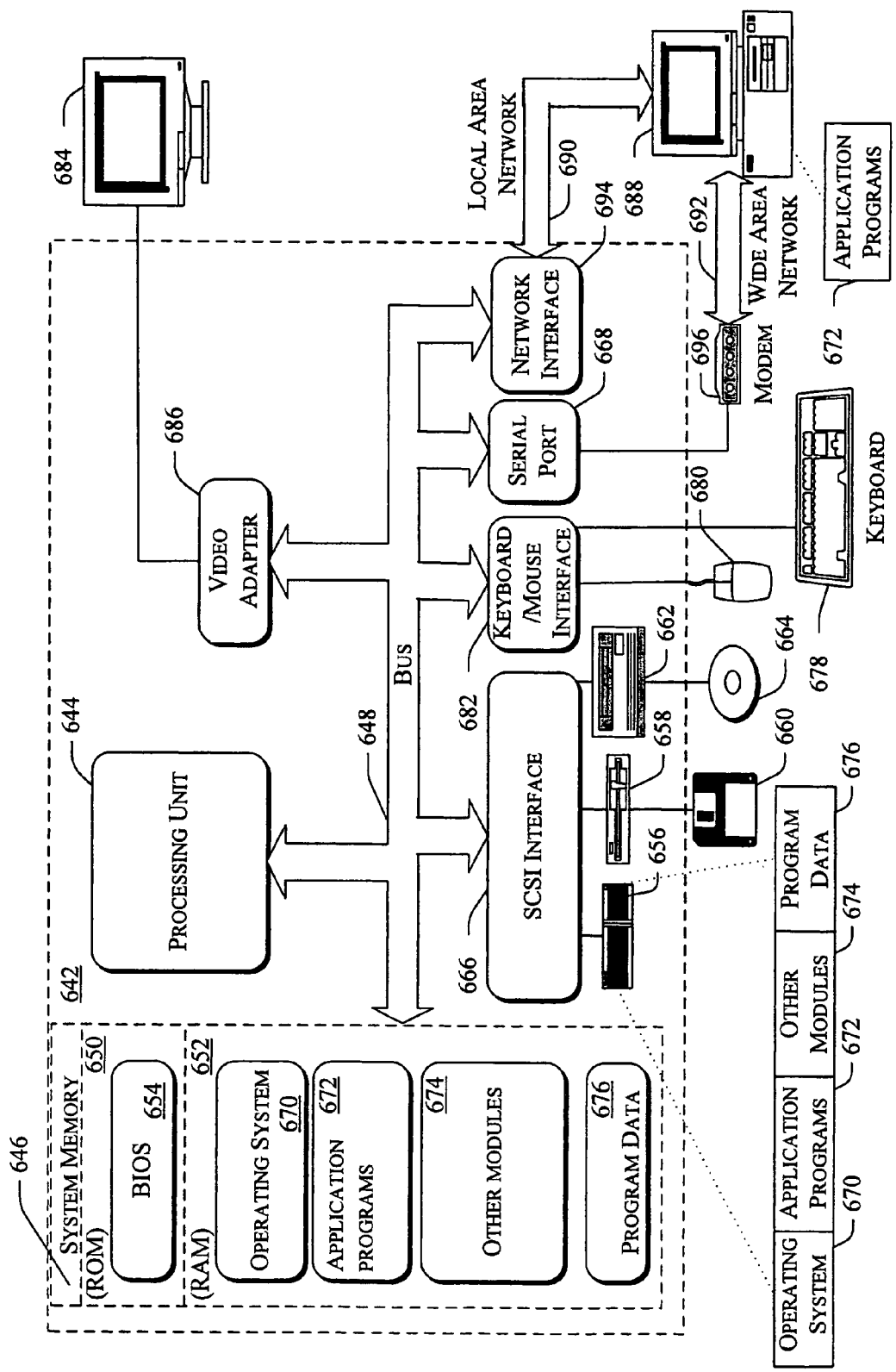
FIG. 6 illustrates an exemplary computing device that can be used to implement one or more of the described embodiments.

FIG. 6 shows an exemplary computing device that can be used to implement the processes described above. Computing device 642 comprises one or more processors or processing units 644, a system memory 646, and a bus 648 that couples various system components including the system memory 646 to processors 644. The bus 648 represents one or more of any of several types of bus structures, including a memory bus or memory controller, a peripheral bus, an accelerated graphics port, and a processor or local bus using any of a variety of bus architectures. The system memory 646 comprises read only memory (ROM) 650 and random access memory (RAM) 652. A basic input/output system (BIOS) 654, containing the basic routines that help to transfer information between elements within computing device 642, such as during start-up, is stored in ROM 650.

Computing device 642 can further comprise a hard disk drive 656 for reading from and writing to a hard disk (not shown), a magnetic disk drive 658 for reading from and writing to a removable magnetic disk 660, and an optical disk drive 662 for reading from or writing to a removable optical disk 664 such as a CD ROM or other optical media. The hard disk drive 656, magnetic disk drive 658, and optical disk drive 662 are connected to the bus 648 by an SCSI interface 666 or some other appropriate interface. The drives and their associated computer-readable media provide nonvolatile storage of computer-readable instructions, data structures, program modules and other data for computer 642. Although the exemplary environment described herein employs a hard disk, a removable magnetic disk 660 and a removable optical disk 664, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 656, magnetic disk 660, optical disk 664, ROM 650, or RAM 652, including an operating system 670, one or more application programs 672 (such as a user agent or browser), other program modules 674, and program data 676. A user may enter commands and information into computer 642 through input devices such as a keyboard 678 and a pointing device 680. Other input devices (not shown) may comprise a microphone, joystick, game pad, satellite dish, scanner, or the like. These and other input devices are connected to the processing unit 644 through an interface 682 that is coupled to the bus 648. A monitor 684 or other type of display device is also connected to the bus 648 via an interface, such as a video adapter 686. In addition to the monitor, personal computers typically comprise other peripheral output devices (not shown) such as speakers and printers.

Computer 642 commonly operates in a networked environment using logical connections to one or more remote computers, such as a remote computer 688. The remote computer 688 may be another personal computer, a server, a router, a network PC, a peer device or other common network node, and typically comprises many or all of the elements described above relative to computer 642. The logical connections depicted in FIG. 6 comprise a local area network (LAN) 690 and a wide area network (WAN) 692. Such networking environments are commonplace in offices, enterprise-wide computer networks, intranets, and the Internet.

When used in a LAN networking environment, computer 642 is connected to the local network through a network interface or adapter 694. When used in a WAN networking environment, computer 642 typically comprises a modem 696 or other means for establishing communications over the wide area network 692, such as the Internet. The modem 696, which may be internal or external, is connected to the bus 648 via a serial port interface 668. In a networked environment, program modules depicted relative to the personal computer 642, or portions thereof, may be stored in the remote memory storage device. It will be appreciated that the network connections shown are exemplary and other means of establishing a communications link between the computers may be used.

Generally, the data processors of computer 642 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The various embodiments described above can support a richly dynamic form environment that permits editing on the client side and can alleviate many of the server-imposed processing complexities that have existed in the past. In at least some embodiments, complex editing scenarios permit users to make complex editing changes on a form, and have those editing changes captured and rendered on the client side for later communication to the server. Particular aspects of at least some of the embodiments described above can permit scalability, and can, in at least some instances, be employed in the context of a wide variety of browsers having different levels of capability, e.g. "thin" and "thick" browsers.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   receiving, with a form server, a request that embodies form changes to a form control that is configured to control data entered in a form control field presented on a client device;
   loading previous data that was used to present the form, into a data tree;
   operating on the data tree sufficient to incorporate the changes to the form control to manipulate the structure of form;
   after all of the changes are incorporated on the data tree, instantiating, for the first time relative to the changes that were just incorporated, a view tree based on the data tree;
   rendering a markup representation of the view tree; and
   returning the markup representation to a user agent for the client device from which the request was received.

2. The method of claim 1, wherein said act of operating comprises mapping at least one identifier associated with the form control onto a corresponding node in the data tree and performing one or more operations on data associated with the form control.

3. The method of claim 1, wherein the act of receiving is performed by receiving an event log that embodies the order in which form changes were made.

4. The method of claim 1, wherein the act of receiving is performed by receiving an event log that embodies the order in which form changes were made, and wherein the act of operating on the data tree comprises serially processing each entry in the event log and, responsively, operating on the data tree.

5. The method of claim 1, wherein the act of receiving is performed by receiving an event log that embodies the order in which form changes were made, and wherein the event log comprises a descriptor field that contains one or more of a descriptor or a command for particular user editing actions.

6. The method of claim 1, wherein the act of receiving is performed by receiving an event log that embodies the order in which form changes were made, and wherein the event log comprises:

a descriptor field that contains a descriptor or command for particular user editing actions; and a control ID field that contains values associated with a control identifier for an associated descriptor.

7. The method of claim 1, wherein the act of receiving is performed by receiving an event log that embodies the order in which form changes were made, and wherein the event log comprises:

a descriptor field that contains a descriptor or command for particular user editing actions;

a control ID field that contains values associated with a control identifier for an associated descriptor; and a parameters field that contains parameters associated with a particular user action.

8. The method of claim 1, wherein the act of receiving is performed by receiving an event log that embodies the order in which form changes were made, and wherein the event log comprises:

a descriptor field that contains a descriptor or command for particular user editing actions;

a control ID field that contains values associated with a control identifier for an associated descriptor;

a parameters field that contains parameters associated with a particular user action; and a value field for maintaining entries associated with new values for a control.

9. The method of claim 1, wherein the act of receiving is performed by receiving an event log that embodies the order in which form changes were made, and wherein the event log comprises:

a descriptor field that contains a descriptor or command for particular user editing actions;

a control ID field that contains values associated with a control identifier for an associated descriptor;

a parameters field that contains parameters associated with a particular user action;

a value field for maintaining entries associated with new values for a control; and a new control ID field associated with the form control.

10. The method of claim 1, wherein the act of instantiating is performed by applying a transform to the data tree.

11. The method of claim 1, wherein at least one of the changes comprises a structural change to the form.

12. One or more computer-readable media embodying computer-readable instructions thereon which, when executed by one or more processors, cause the one or more processors to implement a method comprising:

receiving, with a form server, a request that embodies form changes to a form control that controls data entered in a form entry field in a form, wherein the request comprises an event log that embodies the order in which form changes were made;

loading previous data that corresponds to data previously entered into the form control field in the form, into a data tree;

operating on the data tree sufficient to incorporate the changes;

instantiating a view tree based on the data tree;

rendering a markup representation of the view tree; and returning the markup representation to a user agent from which the request was received such that the form populates the form control field with the previous data entered in the form control field.

13. The one or more computer-readable media of claim 12, wherein said act of operating comprises mapping at least one identifier associated with the form control onto a corresponding node in the data tree and performing one or more operations on data associated with the form control.

14. The one or more computer-readable media of claim 12, wherein the act of operating on the data tree comprises serially processing each entry in the event log and, responsively, operating on the data tree.

15. The one or more computer-readable media of claim 12, wherein the event log comprises a descriptor field that contains one or more of a descriptor or a command for particular user editing actions.

16. The one or more computer-readable media of claim 12, wherein the event log comprises:

a descriptor field that contains one or more of a descriptor or a command for particular user editing actions; and a control ID field that contains values associated with a control identifier for an associated descriptor.

17. The one or more computer-readable media of claim 12, wherein the event log comprises:

a descriptor field that contains a descriptor or command for particular user editing actions;

a control ID field that contains values associated with a control identifier for an associated descriptor; and a parameters field that contains parameters associated with a particular user action.

18. The one or more computer-readable media of claim 12, wherein the event log comprises:

a descriptor field that contains a descriptor or command for particular user editing actions;

a control ID field that contains values associated with a control identifier for an associated descriptor;

a parameters field that contains parameters associated with a particular user action; and a value field for maintaining entries associated with new values for form controls included in the form.

19. The one or more computer-readable media of claim 12, wherein the event log comprises:

a descriptor field that contains a descriptor or command for particular user editing actions;

a control ID field that contains values associated with a control identifier for an associated descriptor;

a parameters field that contains parameters associated with a particular user action;

a value field for maintaining entries associated with new values for a control; and a new control ID field associated with the form control.

20. The one or more computer-readable media of claim 12, wherein the act of instantiating is performed by applying a transform to the data tree.

21. The one or more computer-readable media of claim 12, wherein at least one of the changes comprises a structural change to the form.

22. A method comprising:

receiving, with a form server, a request that embodies form changes to a form control that is configured to control data entered in a form control field in a form, wherein the request comprises an event log that embodies the order in which form changes were made;

loading previous data, that corresponds to data previously entered in the form control field in the form during a previous use of the form, into a data tree;

operating on the data tree sufficient to incorporate the changes;

instantiating a view tree based on the data tree;

rendering a markup representation of the view tree; and returning the HTML representation to a user agent such that the previous data is entered in the form control field when presented by the user agent from which the request was received.

23. The method of claim 22, wherein said act of operating comprises mapping at least one identifier associated with the form control onto a corresponding node in the data tree and performing one or more operations on data associated with the form control.

24. The method of claim 22, wherein the act of operating on the data tree comprises serially processing each entry in the event log and, responsively, operating on the data tree.

25. The method of claim 22, wherein the event log comprises a descriptor field that contains a descriptor or command for particular user editing actions.

26. The method of claim 22, wherein the event log comprises:
 a descriptor field that contains a descriptor or command for particular user editing actions; and
 a control ID field that contains values associated with a control identifier for an associated descriptor.

27. The method of claim 22, wherein the event log comprises:
 a descriptor field that contains a descriptor or command for particular user editing actions;
 a control ID field that contains values associated with a control identifier for an associated descriptor; and
 a parameters field that contains parameters associated with a particular user action.

28. The method of claim 22, wherein the event log comprises:
 a descriptor field that contains a descriptor or command for particular user editing actions;
 a control ID field that contains values associated with a control identifier for an associated descriptor;
 a parameters field that contains parameters associated with a particular user action; and
 a value field for maintaining entries associated with new values for the form control.

29. The method of claim 22, wherein the event log comprises:
 a descriptor field that contains a descriptor or command for particular user editing actions;
 a control ID field that contains values associated with a control identifier for an associated descriptor;
 a parameters field that contains parameters associated with a particular user action;
 a value field for maintaining entries associated with new values for a control; and
 a new control ID field associated with the form control.

30. The method of claim 22, wherein the act of instantiating is performed by applying a transform to the data tree.

31. The method of claim 22, wherein at least one of the changes comprises a structural change to the form.

32. A method comprising:
 receiving, with a form server, a request that embodies form changes to a form control that controls data entry in a form control field, wherein the request comprises an event log that embodies the order in which form changes were made to a form;
 loading previous data, that corresponds to the form entered during a previous use with the form, into a data tree;
 operating on the data tree sufficient to incorporate the changes into the form;
 returning to a user agent from which the request was received the previous data that can be used by the user agent to render a new form that includes the previous data entered in the form control field.

33. The method of claim 32, wherein said act of operating comprises mapping at least one identifier associated with the form control onto a corresponding node in the data tree and performing one or more operations on data associated with the form control.

34. The method of claim 32, wherein the act of returning comprises returning HTML data to the user agent, wherein the HTML data comprises all of the HTML data that is to be used to render the form.

35. The method of claim 32, wherein the act of returning comprises returning only data associated with changes that have been made to the form.

36. A system comprising:
 a form server, configured to communicate with a client device, comprising:
  means for receiving a request that embodies form changes to a form control that controls data entered in a form control field, wherein the request embodies the order in which form changes were made;
  means for loading previous data that corresponds to the form control, into a data tree, the previous data being entered during a previous visit to a web site supported by the form server;
  means for operating on the data tree sufficient to incorporate the changes; and
  means for returning, to a user agent from which the request was received, the previous data that can be used by the user agent to render a new form with the previous data in the form control field.

37. The system of claim 36, wherein said means for returning comprises means for providing data that can be used to render the form on different types of devices.

38. The system of claim 36, wherein said means for returning comprises means for providing data that can be used to render the form using different presentation technologies.

39. The system of claim 36, wherein said means for returning comprises means for providing data that can be used to render the form on different types of devices and using different presentation technologies.

40. The system of claim 36, wherein said request comprises log means.

* * * * *